(12) United States Patent
Li et al.

(10) Patent No.: US 11,888,563 B2
(45) Date of Patent: Jan. 30, 2024

(54) CHANNEL STATE INFORMATION REPORTING METHOD AND APPARATUS

(71) Applicant: HUAWEI TECHNOLOGIES CO., LTD., Guangdong (CN)

(72) Inventors: Xueru Li, Beijing (CN); Ruiqi Zhang, Beijing (CN); Kunpeng Liu, Beijing (CN); Xianda Liu, Beijing (CN); Yongxing Zhou, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 426 days.

(21) Appl. No.: 17/171,627

(22) Filed: Feb. 9, 2021

(65) Prior Publication Data

US 2021/0167829 A1 Jun. 3, 2021

Related U.S. Application Data

(63) Continuation of application No. PCT/CN2018/099907, filed on Aug. 10, 2018.

(51) Int. Cl.
*H04B 7/06* (2006.01)
*H04B 17/345* (2015.01)
(Continued)

(52) U.S. Cl.
CPC ......... *H04B 7/0626* (2013.01); *H04B 17/345* (2015.01); *H04L 5/0048* (2013.01); *H04W 72/23* (2023.01)

(58) Field of Classification Search
CPC ... H04B 7/0626; H04B 17/345; H04W 72/23; H04L 5/0048
See application file for complete search history.

(56) References Cited

U.S. PATENT DOCUMENTS 9,954,667 B2 * 4/2018 Papasakellariou ...... H04L 5/001
10,050,757 B2 * 8/2018 Kim ..................... H04W 72/23
(Continued)

FOREIGN PATENT DOCUMENTS

CN 105052061 A 11/2015
CN 107231825 A 10/2017
(Continued)

OTHER PUBLICATIONS

Huawei et al: "CSI acquisition details for NCJT",3GPP Draft; R1-1713760,Aug. 20, 2017,XP051316559, total 8 pages.
(Continued)

*Primary Examiner* — Chandrahas B Patel
(74) *Attorney, Agent, or Firm* — WOMBLE BOND DICKINSON (US) LLP

(57) ABSTRACT

This application provides a channel state information reporting method and apparatus. The method includes: A terminal device receives M pieces of downlink control information, where first downlink control information in the M pieces of downlink control information indicates a first channel state information configuration, the first channel state information configuration is associated with a first channel state information interference measurement CSI-IM resource group, and the first CSI-IM resource group includes $N_1$ CSI-IM resources, where M and $N_1$ are positive integers, and $N_1$ is greater than 1; and the terminal device measures a target CSI-IM resource, and reports channel state information, where the target CSI-IM resource is determined by the terminal device from the $N_1$ CSI-IM resources based on M, and a quantity of target CSI-IM resources is less than $N_1$.

20 Claims, 6 Drawing Sheets

(51) Int. Cl.
  *H04L 5/00*    (2006.01)
  *H04W 72/23*   (2023.01)

(56)         References Cited

U.S. PATENT DOCUMENTS 11,438,045 B2 *   9/2022  Park .................... H04B 7/0617
  2021/0391906 A1*  12/2021 Oteri .................... H04L 5/0048

FOREIGN PATENT DOCUMENTS

CN    107431574   A    12/2017
  WO    2017135737  A1    8/2017
  WO    2017222329  A1   12/2017
  WO    2018127181  A1    7/2018

OTHER PUBLICATIONS

Huawei et al: "General framework for CSI acquisition and beam management", 3GPP Draft; R1-1712226,Aug. 20, 2017, XP051315043,total 10 pages.

GATT: "General CSI framework for CSI acquisition and beam management", 3GPP Draft; R1-1717814, Oct. 8, 2017, XP051340999, total 6 pages.

3GPP TSG RAN WG1 NR Ad Hoc Meeting,R1-1710451,CSI acquisition details for NCJT, Huawei, HiSilicon,Qingdao, China, Jun. 27-30, 2017,total 5 pages.

* cited by examiner

CHANNEL STATE INFORMATION REPORTING METHOD AND APPARATUS

CROSS-REFERENCE TO RELATED APPLICATIONS

This application is a continuation of International Application No. PCT/CN2018/099907, filed on Aug. 10, 2018, the disclosure of which is hereby incorporated by reference in its entirety.

TECHNICAL FIELD

This application relates to the communications field, and in particular, to a channel state information reporting method and apparatus in the communications field.

BACKGROUND

A terminal device moves from a center of a coverage area of a base station to an edge area of the base station. Because the edge area is within coverage areas of a plurality of base stations, other signal transmission causes strong interference to the terminal device, and consequently data transmission performance of the terminal device is poor. To improve the data transmission performance of the terminal device at the edge, a multi-station coordinated transmission (multi-TRP) mechanism is introduced in long term evolution (long term evolution, LTE) and new radio (new radio, NR). In this mechanism, the plurality of base stations may serve the terminal device, and interference originally caused by another base station may become a useful signal, thereby improving performance of the terminal device at the edge.

In a current multi-TRP transmission mechanism, whether one specified base station in the plurality of base stations is to transmit data to the terminal device or whether the plurality of base stations are to transmit data to the terminal device may be dynamically selected based on channel state information (CSI) from each base station to the terminal device. The former is referred to as single-station transmission or dynamic transmission point selection (DPS), and the latter is referred to as multi-station joint transmission (JT). Specifically, the multi-station joint transmission further includes coherent joint transmission (CJT) or non-coherent transmission (NCJT). In a network, whether to use the CJT or the NCJT depends on a delay of information exchange between base stations. The CJT requires dynamic information exchange between the plurality of base stations, and a data scheduling decision may be dynamically made based on information (for example, CSI) of each base station. Therefore, a high delay requirement is imposed on the exchange between the base stations. However, the NCJT does not require dynamic information exchange between base stations, and has a low delay requirement on the exchange. Therefore, the NCJT is more suitable for network deployment. To determine which mechanism of the DPS or the JT is to be used, the terminal device may measure and report CSI in each mechanism based on a channel state information reference signal (CSI-RS) sent by each of the plurality of base stations, and then the base station makes a data scheduling decision. Alternatively, the terminal device may measure CSI in a plurality of transmission mechanisms based on a CSI-RS sent by a base station, and recommend a transmission mechanism to the base station as reference information for a subsequent data scheduling decision.

However, each base station independently makes a decision on sending of a CSI-RS, triggering of a CSI report, and data scheduling. As a result, CSI measured by the terminal device for each serving base station at a specified moment cannot accurately reflect a channel status during subsequent data scheduling, especially an interference situation experienced by data sent by each base station, thereby severely deteriorating data demodulation performance of the above multi-TRP transmission mechanism. Therefore, how to avoid dynamic information exchange and improve accuracy of a CSI measurement result has become a technical problem that needs to be urgently resolved.

SUMMARY

This application provides a channel state information reporting method and apparatus, to avoid dynamic information exchange and improve accuracy of a CSI measurement result.

According to a first aspect, a channel state information reporting method is provided, including: A terminal device receives M pieces of downlink control information, where first downlink control information in the M pieces of downlink control information indicates a first channel state information configuration, the first channel state information configuration is associated with a first channel state information interference measurement CSI-IM resource group, and the first CSI-IM resource group includes $N_1$ CSI-IM resources, where M and $N_1$ are positive integers, and $N_1$ is greater than 1; and the terminal device measures a target CSI-IM resource, and reports channel state information, where the target CSI-IM resource is determined by the terminal device from the $N_1$ CSI-IM resources based on M, and a quantity of target CSI-IM resources is less than $N_1$.

Specifically, in a multi-TRP transmission network, the terminal device may receive downlink control information from a plurality of network devices (which may be specifically serving base stations), to trigger the terminal device to report CSI. To avoid dynamic information exchange, the CSI is measured through pre-scheduling in this embodiment of this application. The "pre-scheduling" means that a serving base station makes a semi-static agreement. To be specific, if each serving base station needs to schedule data for the terminal device at a moment t+k, the serving base station sends downlink control information at a moment t, to trigger an associated CSI report. There is a specific association relationship between CSI reports triggered by the serving base stations. The CSI report triggered by the downlink control information sent by each serving base station is associated with a CSI-RS resource and a CSI-IM resource group of the serving base station. The DCI of each base station triggers only the CSI, and the CSI-RS resource and the CSI-IM resource associated with the CSI, and does not need to trigger a CSI-RS resource of another base station (that is, it is not necessary to make a decision for the another base station or know a decision of the another base station). In this way, serving base stations do not need to know scheduling policies and CSI measurement decisions of each other, and a delay caused by information exchange is avoided. In this embodiment of this application, the first DCI indicates the first CSI configuration. The first CSI configuration is associated with at least two CSI-IM resources. There are two types of CSI-IM resources in the at least two CSI-IM resources. The two types of CSI-IM resources separately correspond to different transmission mechanisms, that is, are used to measure interference information in the different transmission mechanisms. Therefore, the terminal device may determine, based on a quantity (M) of pieces of received DCI, whether a data transmission mechanism in the future is multi-station joint transmission or single-station transmission, to select the target CSI-IM resource from the two types of CSI-IM resources, and obtain interference information by measuring the target CSI-IM resource. Further, the terminal device may measure a CSI-RS resource to perform channel measurement.

According to the channel state information reporting method in this embodiment of this application, the terminal device determines, based on a quantity of pieces of received downlink control information, a transmission mechanism used for data transmission in the future, selects a target CSI-IM resource from at least two CSI-IM resources to perform interference measurement, and reports channel state information, to avoid dynamic information exchange and improve accuracy of a CSI measurement result, thereby improving system performance.

In one embodiment, when M≥2, second downlink control information in the M pieces of downlink control information indicates a second channel state information configuration, the second channel state information configuration is associated with a second CSI-IM resource group, the second CSI-IM resource group includes $N_2$ CSI-IM resources, and there is an association relationship between the first channel state information configuration and the second channel state information configuration, where $N_2$ is a positive integer.

Specifically, if the terminal device receives at least two pieces of downlink control information sent by at least two network devices, and CSI configurations indicated by the at least two pieces of downlink control information are associated, it indicates that the at least two network devices need to schedule the terminal device at a same moment to perform data transmission. The first DCI indicates the first CSI configuration, the second DCI indicates the second CSI configuration, the first CSI configuration is associated with the $N_1$ CSI-IM resources, the second CSI configuration is associated with the $N_2$ CSI-IM resources, and there is an association relationship between the first CSI configuration and the second CSI configuration.

It should be understood that the association relationship specifically means that both the first CSI configuration and the second CSI configuration may be used for multi-TRP transmission. The association relationship may be implemented in a plurality of manners. This is not limited in this embodiment of this application.

In one embodiment, the first channel state information configuration is the same as the second channel state information configuration.

Specifically, content of the first CSI configuration and the second CSI configuration may be totally the same. It should be understood that, that the first CSI configuration is the same as the second CSI configuration may mean that resources associated with the first CSI configuration and the second CSI configuration are totally the same, or may mean that the second CSI configuration is the first CSI configuration. If the second CSI configuration is the first CSI configuration, in a possible implementation, the first CSI configuration is further associated with the $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

It should be understood that the content of the first CSI configuration and the second CSI configuration may be alternatively different. In this case, the first CSI configuration and the second CSI configuration may separately configure different report content. For example, the first CSI configuration is used to report at least one of a rank indication (rank indication, RI), a type I (Type I) precoding matrix indicator (precoding matrix indicator, PMI), and a channel quality indicator (channel quality indicator, CQI), and the second CSI configuration is used to report at least one of an RI, a type II PMI, and a CQI. For another example, the PMI in the first CSI configuration is a codebook based on 16 ports, and the PMI in the second CSI configuration is a codebook based on 32 ports. This is not limited in this embodiment of this application. Parameters of the two CSI configurations are not totally the same, and may be more flexible, and therefore are more applicable to different situations such as antenna structures and processing capabilities of different base stations in an actual system.

If the first CSI configuration and the second CSI configuration are different, the network device may indicate the association relationship between the first CSI configuration and the second CSI configuration by using first indication information and/or fourth indication information. The first indication information and/or the fourth indication information may be carried in radio resource control (radio resource control, RRC) signaling, or may be carried in DCI. This is not limited in this embodiment of this application.

In one embodiment, the first channel state information configuration carries first indication information, or the first downlink control information carries the first indication information, and the first indication information is used to indicate that the first channel state information configuration is associated with the second channel state information configuration.

Specifically, the first indication information may indicate, by indicating an index of the second channel state information configuration, that the first channel state information configuration is associated with the second channel state information configuration.

In one embodiment, the second channel state information configuration carries fourth indication information, or the second downlink control information carries the fourth indication information, and the fourth indication information is used to indicate that the second channel state information configuration is associated with the first channel state information configuration.

Specifically, the fourth indication information may indicate, by indicating an index of the first channel state information configuration, that the second channel state information configuration is associated with the first channel state information configuration.

In one embodiment, the first channel state information configuration and the second channel state information configuration are used for a same transmission mechanism set, and the transmission mechanism set includes a multi-station joint transmission mechanism and a single-station transmission mechanism.

Specifically, a network device that sends the first DCI may send second indication information, and the terminal device receives the second indication information, where the second indication information indicates that the first channel state configuration is used for the multi-station joint transmission mechanism or the single-station transmission selection mechanism. A network device that sends the second DCI may send fifth indication information, and the terminal device receives the fifth indication information, where the fifth indication information indicates that the second channel state configuration is used for the multi-station joint transmission mechanism or the single-station transmission selection mechanism. In this embodiment of this application, the network device may further indicate the association relationship between the first CSI configuration and the second CSI configuration by using the second indication information and/or the fifth indication information. The second indication information and/or the fifth indication information may be carried in RRC signaling, or may be carried in DCI. This is not limited in this embodiment of this application.

For example, a channel state information configuration includes the second indication information. When the second indication information is a specific value, the terminal device may consider that CSI measured for the channel state information configuration is used for a multi-TRP transmission scheme. In a possible implementation, when the terminal device receives the M pieces of DCI, and a CSI report triggered by each of the M pieces of DCI carries indication information used for the multi-TRP transmission scheme, the terminal device may determine a data transmission scheme in the further based on a value of M, to select the target CSI-IM resource and measure accurate CSI.

In one embodiment, the $N_1$ CSI-IM resources include a first-type CSI-IM resource and a second-type CSI-IM resource, the first-type CSI-IM resource is used to measure interference information in a multi-station joint transmission mechanism, and the second-type CSI-IM resource is used to measure interference information in a single-station transmission mechanism.

Specifically, if the terminal device determines, based on M, that data is to be transmitted by using the multi-station joint transmission mechanism in the future, the terminal device may determine the first-type CSI-IM resource as the target CSI-IM resource. If the terminal device determines, based on M, that data is to be transmitted by using the single-station transmission mechanism in the future, the terminal device may determine the second-type CSI-IM resource as the target CSI-IM resource. The single-station transmission mechanism may be a DPS mechanism, and the multi-station joint transmission mechanism may be an NCJT mechanism.

In one embodiment, a $j^{th}$ CSI-IM resource in the $N_1$ CSI-IM resources is predefined as the first-type CSI-IM resource or the second-type CSI-IM resource; or the method further includes:

The terminal device receives third indication information, where the third indication information is used to indicate that the $j^{th}$ CSI-IM resource in the $N_1$ CSI-IM resources is the first-type CSI-IM resource or the second-type CSI-IM resource, where $j \in \{1, \ldots, N_1\}$.

Specifically, the first-type CSI-IM resource and the second-type CSI-IM resource in the $N_1$ CSI-IM resources may be predefined, or may be determined according to a predefined rule. For example, a CSI-IM resource whose resource index is an odd number is a first-type CSI-IM resource, and a CSI-IM resource whose resource index is an even number is a second-type CSI-IM resource. For another example, the first p CSI-IM resources are first-type CSI-IM resources and the last q CSI-IM resources are second-type CSI-IM resources in ascending order of resource indexes. For another example, the first p CSI-IM resources are second-type CSI-IM resources and the last q CSI-IM resources are first-type CSI-IM resources in ascending order of resource indexes, where both p and q are positive integers less than $N_1$.

The first-type CSI-IM resource and the second-type CSI-IM resource in the $N_1$ CSI-IM resources may be alternatively configured by the network device for the terminal device by using the third indication information. For example, one bit is used to indicate the $j^{th}$ CSI-IM resource in the $N_1$ CSI-IM resources, 0 indicates that the resource is the first-type CSI-IM resource, and 1 indicates that the resource is the second-type CSI-IM resource, where j is an integer greater than or equal to 1 and less than or equal to $N_1$. For another example, one piece of indication information is used for the $j^{th}$ CSI-IM resource. If the indication information is configured, it indicates that the resource is the first-type CSI-IM resource; or if the indication information is not configured, it indicates that the resource is the second-type CSI-IM resource, where j is an integer greater than or equal to 1 and less than or equal to $N_1$. However, this is not limited in this embodiment of this application.

In one embodiment, at least one first CSI-IM resource exists in the $N_1$ CSI-IM resources, the first CSI-IM resource and at least one of the $N_2$ CSI-IM resources occupy a same time-frequency resource, at least one second CSI-IM resource exists in the $N_1$ CSI-IM resources, and the second CSI-IM resource and all of the $N_2$ CSI-IM resources occupy different time-frequency resources.

Specifically, the $N_1$ CSI-IM resources and the $N_2$ CSI-IM resources include at least one first CSI-IM resource that occupies a same time-frequency resource, which is also referred to as a "same CSI-IM resource" in this specification. The $N_1$ CSI-IM resources and the $N_2$ CSI-IM resources further include at least one second CSI-IM resource that occupies different time-frequency resources, which is also referred to as "different CSI-IM resources" in this specification.

It should be understood that one time-frequency resource may be one resource element (resource element, RE), and is determined by using one orthogonal frequency division multiplexing (orthogonal frequency division multiplexing, OFDM) symbol and one subcarrier.

With reference to the first aspect, in some implementations of the first aspect, the first CSI-IM resource is the first-type CSI-IM resource, and the second CSI-IM resource is the second-type CSI-IM resource.

In other words, the above same CSI-IM resource is the first-type CSI-IM resource that is used to measure the interference information in the multi-station joint transmission mechanism, and the above different CSI-IM resources are the second-type CSI-IM resource that is used to measure the interference information in the single-station transmission mechanism.

In one embodiment, when M=1, the target CSI-IM resource is the second-type CSI-IM resource.

Specifically, when the terminal device receives only one piece of downlink control information, the terminal device may determine that the single-station transmission mechanism is to be used for data transmission in the future, and determine that the target CSI-IM resource is the second-type CSI-IM resource, namely, the above different CSI-IM resources. Optionally, the downlink control information triggers one CSI report, and the CSI report is measured for a multi-TRP transmission mechanism.

In one embodiment, when M=1, the terminal device measures interference information on the determined target CSI-IM resource, determines the channel state information based on the obtained interference information, and reports the channel state information.

In one embodiment, when M≥2, the target CSI-IM resource is the first-type CSI-IM resource.

Specifically, when the terminal device receives at least two pieces of downlink control information at a moment t, the terminal device may determine that a data transmission mechanism at a moment t+k is multi-station joint transmission, and determine the first-type CSI-IM resource as the target CSI-IM resource.

In one embodiment, when M≥2, the target CSI-IM resource is the first-type CSI-IM resource, and the terminal device measures interference information on the target CSI-IM resource and all or a part of CSI-RS resources that are indicated by downlink control information in the M pieces of downlink control information except the first downlink control information, determines the channel state information based on the obtained interference information, and reports the channel state information.

In one embodiment, when M≥2, the target CSI-IM resource is the first-type CSI-IM resource or the second-type CSI-IM resource.

Specifically, when the terminal device receives at least two pieces of downlink control information at a moment t, the terminal device may determine a data transmission mechanism set at a moment t+k. The transmission mechanism set includes single-base station transmission and multi-station joint transmission of at least two base stations. Optionally, the terminal device may separately measure CSI for all or a part of transmission mechanisms, determine a target transmission mechanism by comparing CSI in different transmission mechanisms, and report CSI in the transmission mechanism. The target transmission mechanism may be determined in another manner. This is not limited herein. Optionally, the terminal device may alternatively report one piece of indication information to indicate a transmission mechanism corresponding to currently reported CSI, or indicate an interference hypothesis on which the currently reported CSI is based. In this case, the corresponding target CSI-IM resource may be the first-type CSI-IM resource or the second-type CSI-IM resource. This depends on the target transmission mechanism determined by the terminal device.

In one embodiment, when M≥2 and the target CSI-IM resource is the first-type CSI-IM resource, the terminal device measures interference information on the target CSI-IM resource and all or a part of CSI-RS resources that are indicated by downlink control information in the M pieces of downlink control information except the first downlink control information, determines the channel state information based on the obtained interference information, and reports the channel state information; and/or when M≥2 and the target CSI-IM resource is the second-type CSI-IM resource, the terminal device measures interference information on the target CSI-IM resource, determines the channel state information based on the obtained interference information, and reports the channel state information.

In one embodiment, the first channel state information configuration is further associated with K channel state information reference signal CSI-RS resources, and at least one of the K CSI-RS resources is associated with $N_1$ of the $N_1$ CSI-IM resources, where K is a positive integer, and $1<N_1'\leq N_1$.

Specifically, the first CSI configuration is further associated with the K CSI-RS resources, and the K CSI-RS resources are used by the terminal device to measure channel information. One CSI-RS resource is associated with at least two CSI-IM resources.

It should be understood that, that one CSI-RS resource is associated with at least two CSI-IM resources means that when the CSI-RS resource is used to measure channel information, the terminal device measures at least one target CSI-IM resource in the CSI-IM resources associated with the CSI-RS resource, to obtain corresponding interference information. The channel information and the interference information are used to determine reported CSI, and may be specifically used to determine a CQI in the CSI. The target CSI-IM resource may be determined based on M.

In one embodiment, the first CSI-IM resource group occupies X sub-bands, and a target CSI-IM resource on an $x^{th}$ sub-band in the X sub-bands is determined by the terminal device based on a quantity of CSI-IM resource groups that occupy the $x^{th}$ sub-band in CSI-IM resource groups indicated by the M pieces of downlink control information, where X is a positive integer, and X∈ $\{1, 2, \ldots, X\}$.

Specifically, CSI-IM resources sent by two network devices may occupy different sub-bands. Therefore, even if a quantity of pieces of DCI received by the terminal device is greater than or equal to 2, the terminal device needs to determine a transmission mechanism based on a quantity of CSI-IM resource groups on each sub-band. The data transmission mechanism can be multi-station joint transmission only on a sub-band occupied by CSI-IM resource groups indicated by two pieces of DCI. The data transmission mechanism is still single-station transmission on a sub-band occupied by only one CSI-IM resource group.

According to the channel state information reporting method in this embodiment of this application, a target CSI-IM resource on each sub-band can be determined for different sub-bands, and a transmission mechanism used for data transmission in the future is determined at a finer granularity, so that a CSI measurement result is more accurate.

According to a second aspect, a channel state information reporting method is provided, including: A network device determines a first channel state information configuration, where the first channel state information configuration is associated with K channel state information reference signal CSI-RS resources and $N_1$ channel state information interference measurement CSI-IM resources, and at least one of the K CSI-RS resources is associated with $N_1$ of the $N_1$ CSI-IM resources, where K and $N_1$ are positive integers, and $1<N_1'\leq N_1$; and the network device sends the first channel state information configuration to a terminal device.

In one embodiment, the first channel state information configuration is further associated with $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

In one embodiment, the first channel state information configuration includes first indication information; or the method further includes: The network device sends the first indication information.

The first indication information is used to indicate that the first channel state information configuration is associated with a second channel state information configuration, the second channel state information is associated with $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

In one embodiment, the method further includes: The network device sends second indication information, where the second indication information indicates that the first channel state configuration is used for the multi-station joint transmission mechanism or the single-station transmission selection mechanism.

In one embodiment, the $N_1$ CSI-IM resources include a first-type CSI-IM resource and a second-type CSI-IM resource, the first-type CSI-IM resource is used to measure interference information in a multi-station joint transmission mechanism, and the second-type CSI-IM resource is used to measure interference information in a single-station transmission mechanism.

In one embodiment, a $j^{th}$ CSI-IM resource in the $N_1$ CSI-IM resources is predefined as the first-type CSI-IM resource or the second-type CSI-IM resource; or the method further includes: The network device sends third indication information, where the third indication information is used to indicate that the $j^{th}$ CSI-IM resource in the $N_1$ CSI-IM resources is the first-type CSI-IM resource or the second-type CSI-IM resource, where $j \in \{1, \ldots, N_1\}$.

In one embodiment, the method further includes: The network device sends first downlink control information, where the first downlink control information indicates at least one of the following: the first channel state information configuration, the at least one CSI-RS resource, and the $N_1$ CSI-IM resources. Optionally, the first indication information does not indicate the $N_2$ CIS-IM resources.

In one embodiment, at least one first CSI-IM resource exists in the $N_1$ CSI-IM resources, the first CSI-IM resource and at least one of the $N_2$ CSI-IM resources occupy a same time-frequency resource, at least one second CSI-IM resource exists in the $N_1$ CSI-IM resources, and the second CSI-IM resource and all of the $N_2$ CSI-IM resources occupy different time-frequency resources.

In one embodiment, the first CSI-IM resource is the first-type CSI-IM resource, and the second CSI-IM resource is the second-type CSI-IM resource.

In one embodiment, a resource element (RE) occupied by the first-type CSI-IM resource is not used to send a downlink shared channel.

In one embodiment, if the network device sends, to the terminal device in a first time unit, the first downlink control information that indicates the first channel state information configuration, in a second time unit indicated by the first downlink control information, a resource element (RE) occupied by the second-type CSI-IM resource is not used to send a downlink shared channel.

According to a third aspect, a channel state information reporting apparatus is provided, and is configured to perform the method in any one of the first aspect and the possible implementations of the first aspect. Specifically, the apparatus includes a unit configured to perform the method in any one of the first aspect and the possible implementations of the first aspect.

According to a fourth aspect, another channel state information reporting apparatus is provided, and is configured to perform the method in any one of the second aspect and the possible implementations of the second aspect. Specifically, the apparatus includes a unit configured to perform the method in any one of the second aspect and the possible implementations of the second aspect.

According to a fifth aspect, another channel state information reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor is enabled to perform the method in any one of the first aspect and the possible implementations of the first aspect.

According to a sixth aspect, another channel state information reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor is enabled to perform the method in any one of the second aspect and the possible implementations of the second aspect.

According to a seventh aspect, a channel state information reporting system is provided, and the system includes the apparatus in any one of the third aspect and the possible implementations of the third aspect and the apparatus in any one of the fourth aspect and the possible implementations of the fourth aspect; or the system includes the apparatus in any one of the fifth aspect and the possible implementations of the fifth aspect and the apparatus in any one of the sixth aspect and the possible implementations of the sixth aspect.

According to an eighth aspect, a computer program product is provided, and the computer program product includes computer program code. When the computer program code runs on a computer, the computer is enabled to perform the methods in the foregoing aspects.

According to a ninth aspect, a computer readable medium is provided, configured to store a computer program. The computer program includes an instruction used to perform the methods in the foregoing aspects.

According to a tenth aspect, a chip is provided, including a processor, configured to invoke an instruction from a memory and run the instruction stored in the memory, so that a communications device on which the chip is mounted is enabled to perform the methods in the foregoing aspects.

According to an eleventh aspect, another chip is provided, including an input interface, an output interface, a processor, and a memory. The input interface, the output interface, the processor, and the memory are connected by using an internal connection path, the processor is configured to execute code in the memory, and when the code is executed, the processor is configured to perform the methods in the foregoing aspects.

DESCRIPTION OF EMBODIMENTS

Figure 1:
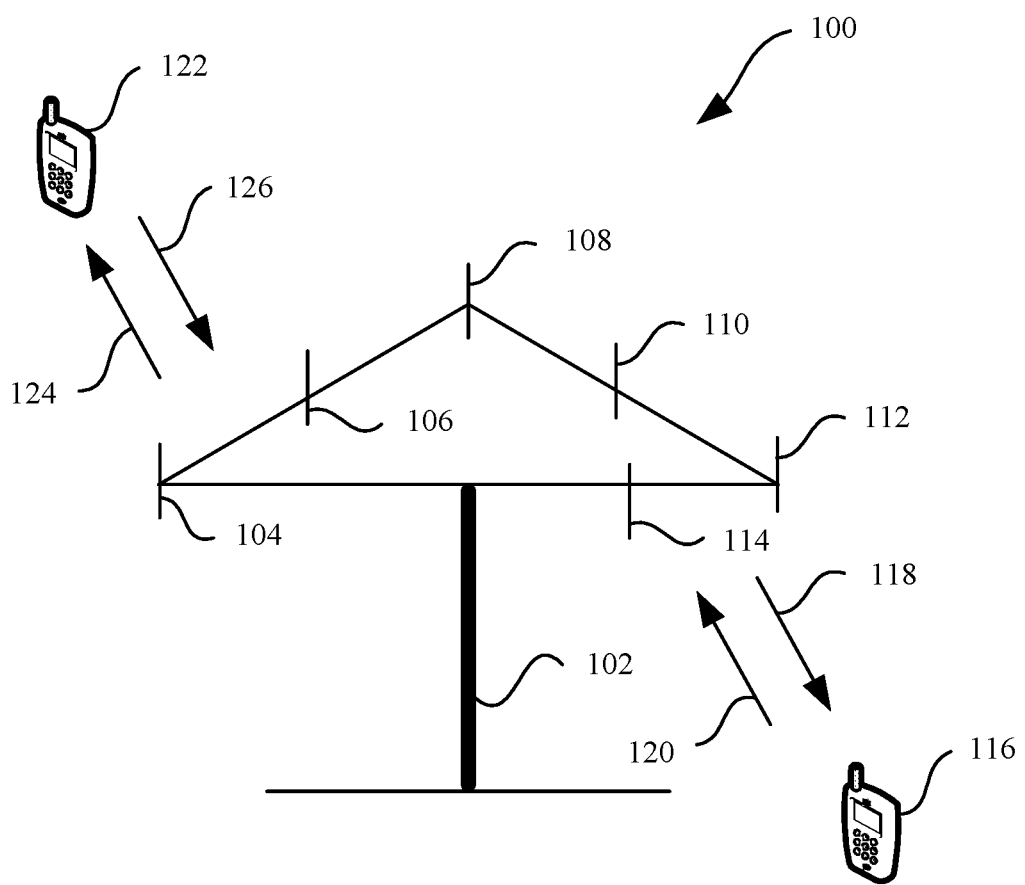
FIG. 1 is a schematic diagram of a communications system according to an embodiment of this application.

The following describes the technical solutions of this application with reference to the accompanying drawings.

It should be understood that the technical solutions of the embodiments of this application may be used in various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (G) system or new radio (NR) system, and the like.

It should be further understood that the technical solutions in the embodiments of this application may be further used in various communications systems that are based on a non-orthogonal multiple access technology, such as a sparse code multiple access (SCMA) system. Certainly, the SCMA may also have another name in the communications field. Further, the technical solutions in the embodiments of this application may be used in a multicarrier transmission system that uses the non-orthogonal multiple access technology, such as an orthogonal frequency division multiplexing (OFDM) system, a filter bank multicarrier (FBMC) system, a generalized frequency division multiplexing (GFDM) system, or a filtered orthogonal frequency division multiplexing (filtered-OFDM, F-OFDM) system that uses the non-orthogonal multiple access technology.

It should also be understood that, a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

It should be further understood that in the embodiments of this application, a network device may be configured to communicate with a terminal device. The network device may be a base transceiver station (BTS) in a GSM system or a CDMA system, may be a NodeB (NB) in a WCDMA system, or may be an evolved NodeB (evolutional node B, eNB or eNode B) in an LTE system. Alternatively, the network device may be a relay station, an access point, a vehicle-mounted device, a wearable device, a network-side device in a future 5G network, a network device in a future evolved PLMN network, or the like.

The embodiments of this application are applicable to an LTE system and a subsequent evolved system such as 5G or other wireless communications systems using various radio access technologies, for example, systems using access technologies such as code division multiple access, frequency division multiple access, time division multiple access, orthogonal frequency division multiple access, and single carrier frequency division multiple access, and particularly applicable to a scenario in which channel information needs to be fed back and/or a two-stage precoding technology needs to be used, for example, a wireless network using a massive MIMO technology or a wireless network using a distributed antenna technology.

It should be understood that a multiple-input multiple-output (MIMO) technology is a technology in which a transmit end device and a receive end device separately use a plurality of transmit antennas and a plurality of receive antennas to transmit and receive signals by using the plurality of antennas of the transmit end device and the receive end device, thereby improving communication quality. In the technology, spatial resources can be fully used, and multiple-output multiple-input is implemented by using a plurality of antennas, so that a system channel capacity can be exponentially increased without increasing spectrum resources and antenna transmit power.

MIMO may be classified into single user multiple-input multiple-output (single-user MIMO, SU-MIMO) and multi-user multiple-input multiple-output (multi-user MIMO, MU-MIMO). In massive MIMO, based on a principle of multi-user beamforming, hundreds of antennas are disposed on the transmit end device to modulate respective beams of dozens of target receivers, to simultaneously transmit dozens of signals on a same frequency resource by isolating spatial signals. Therefore, in the massive MIMO technology, a spatial degree of freedom brought by configuring a large quantity of antennas can be fully used to improve spectral efficiency.

FIG. 1 is a schematic diagram of a communications system to which an embodiment of this application is applied. As shown in FIG. 1, a communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. Two antennas are shown for each antenna group in FIG. 1. However, each group may have more or fewer antennas. The network device 102 may additionally include a transmitter chain and a receiver chain. A person of ordinary skill in the art may understand that both the transmitter chain and the receiver chain may include a plurality of components, such as a processor, a modulator, a multiplexer, a demodulator, a demultiplexer, or an antenna related to signal sending and receiving.

The network device 102 may communicate with a plurality of terminal devices, for example, the network device 102 may communicate with a terminal device 116 and a terminal device 122. However, it may be understood that the network device 102 may communicate with any quantity of terminal devices that are similar to the terminal device 116 or the terminal device 122. The terminal device 116 and the terminal device 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antenna 112 and the antenna 114. The antenna 112 and the antenna 114 each send information to the terminal device 116 over a forward link 118, and receive information from the terminal device 116 over a reverse link 120. In addition, the terminal device 122 communicates with the antenna 104 and the antenna 106. The antenna 104 and the antenna 106 each send information to the terminal device 122 over a forward link 124, and receive information from the terminal device 122 over a reverse link 126.

For example, in a frequency division duplex FDD system, for example, the forward link 118 and the reverse link 120 may use different frequency bands, and the forward link 124 and the reverse link 126 may use different frequency bands.

For another example, in a time division duplex TDD system and a full duplex (full duplex) system, the forward link 118 and the reverse link 120 may use a same frequency band, and the forward link 124 and the reverse link 126 may use a same frequency band.

Each antenna group and/or each area that are/is designed for communication are/is referred to as a sector of the network device 102. For example, the antenna group may be designed to communicate with a terminal device in a sector of a coverage area of the network device 102. In a process in which the network device 102 communicates with the terminal device 116 and the terminal device 122 over the forward link 118 and the forward link 124 respectively, transmit antennas of the network device 102 may improve signal-to-noise ratios of the forward link 118 and the forward link 124 through beamforming. In addition, when the network device 102 sends, through beamforming, signals to the terminal device 116 and the terminal device 122 that are randomly scattered in a related coverage area, interference to a mobile device in a neighboring cell is less than that caused when a network device sends signals to all terminal devices of the network device by using a single antenna.

Within a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communications sending apparatus may obtain a specific quantity of data bits that need to be sent to the wireless communications receiving apparatus by using a channel. For example, the wireless communications sending apparatus may generate, receive from another communications apparatus, or store in a memory, a specific quantity of data bits that need to be sent to the wireless communications receiving apparatus through a channel. Such a data bit may be included in a transport block or a plurality of transport blocks of data, and the transport blocks may be segmented to produce a plurality of code blocks.

In addition, the communications system 100 may be a public land mobile network PLMN network, a device-to-device (device to device, D2D) network, a machine-to-machine (machine to machine, M2M) network, or another network. FIG. 1 is merely a simplified schematic diagram of an example for ease of understanding. The network may further include another network device that is not shown in FIG. 1.

For ease of understanding, the following first describes scenarios and related terms in the embodiments of this application.

A terminal device moves from a center of a coverage area of a base station to an edge area of the base station. Because the edge area is within coverage areas of a plurality of base stations, other signal transmission causes strong interference to the terminal device, and consequently data transmission performance of the terminal device is poor. To improve the data transmission performance of the terminal device at the edge, a multi-station coordinated transmission (multi-TRP) mechanism is introduced in long term evolution (long term evolution, LTE) and new radio (new radio, NR). In this mechanism, the plurality of base stations may serve the terminal device, and interference originally caused by another base station may become a useful signal, thereby improving performance of the terminal device at the edge.

Current multi-TRP transmission mechanisms are classified into three types: single-station transmission, coherent transmission (JT), and non-coherent transmission (NCJT).

1. Single-Station Transmission

The single-station transmission is also referred to as dynamic transmission point selection (DPS). Based on channel state information (CSI) from each base station to the terminal device, a network device or the terminal device dynamically selects a specified base station from the plurality of base stations to serve the terminal device, that is, transmit data to the terminal device.

2. Coherent Transmission JT

The plurality of base stations know all data information and CSI between the plurality of base stations and the terminal device. Therefore, the plurality of base stations are similar to a plurality of distributed antenna arrays, and may jointly precode to-be-transmitted data at a same layer, which are equivalent to one large base station. The coherent transmission may change all interference between the plurality of base stations into a useful signal, to avoid mutual interference and significantly improve data transmission performance. However, the coherent transmission requires dynamic information exchange between the plurality of base stations. The dynamic information exchange means that the base station and the terminal device need to exchange all information before each time of data scheduling, and information is frequently exchanged on a time order of milliseconds (ms). In other words, each base station needs to wait for several milliseconds before actually performing data transmission. After information (for example, CSI) of each serving base station is obtained, all serving base stations jointly determine to use an optimal precoding matrix to perform data transmission with the terminal device. If a delay of the foregoing exchange process is relatively large, a performance gain brought by using this transmission mechanism may not be enough to offset a performance loss caused by an increase in the exchange delay.

3. Non-Coherent Transmission NCJT

The non-coherent transmission is more applicable to an actual situation, that is, there is a specific exchange delay between base stations. To avoid adverse impact caused by an exchange delay, in the non-coherent transmission mechanism, each serving base station independently determines a precoding matrix of data based on CSI from each serving base station to the terminal device without performing joint precoding. In addition, the base stations transmit different data streams to the terminal device. An advantage of using this transmission mechanism is that dynamic information exchange is not required between the base stations, thereby avoiding the exchange delay. However, because the base stations separately transmit different data layers, and independently select precoding matrices, interference may exist between the data layers, and is referred to as "inter-stream interference" in this application.

The inter-stream interference affects signal to interference plus noise ratios (SINR) of data at different layers, thereby affecting demodulation of data at this layer. To ensure accurate demodulation, each base station needs to determine a modulation coding strategy (MCS) based on an SINR of data at this layer when transmitting the data at this layer of each base station. The base station determines the MCS based on a channel quality indicator (CQI) measured and reported by the terminal device. Therefore, whether the CQI reported by the terminal device can correctly reflect an SINR during actual data transmission is critical to data demodulation performance. Usually, the terminal device may receive a channel state information reference signal (CSI reference signal, CSI-RS) sent by the base station, measure a channel on a CSI-RS resource, and measure interference on a channel state information interference measurement (CSI-IM) resource, to calculate a CQI and report the CQI to the base station. It should be understood that in this application, a reference signal resource used to measure a channel is referred to as a CSI-RS resource, and a reference signal resource used to measure interference is referred to as a CSI-IM resource. However, the above resource may have another name, such as an IM resource. This is not limited in the embodiments of this application. In addition, the above CSI-RS resource may be a non-zero power (non zero power, NZP) reference signal resource, and the CSI-IM resource may be a zero power (zero power, ZP) reference signal resource. Further, the base station may determine the MCS based on the CQI, and indicate the MCS to the terminal device for data demodulation.

To reduce a delay and avoid dynamic information exchange, a multi-TRP transmission network that uses only single-station transmission or NCJT is discussed in this specification. In this case, it is assumed that each serving base station independently performs CSI measurement and makes a data scheduling decision.

In an ideal multi-TRP transmission mechanism, it is assumed that a central base station controls all n base stations. The central base station has data information, CSI, and the like of all the base stations. The central base station may determine which of the n base stations is to transmit data to the terminal device, or that the n base stations are to serve the terminal device, that is, select a DPS mechanism or an NCJT mechanism. To determine to use which mechanism, the terminal device needs to report CSI in each mechanism based on a channel state information reference signal (CSI-RS) sent by each base station, and then the central base station makes a CSI measurement decision and a data scheduling decision.

Taking N=2 as an example, the n base stations are specifically a base station 1 and a base station 2. The central base station may configure three CSI reports for the terminal device, and the three CSI reports are as follows:

1. CSI report 1: A corresponding transmission mechanism is single-station transmission of the base station 1.

The terminal device measures, on a CSI-RS resource of the base station 1, channel information from the base station 1 to the terminal device, and measures, on a CSI-IM resource of the base station 1, interference from the base station 2 and another non-serving base station to transmission of the base station 1, to obtain a CQI when only the base station 1 serves the terminal device. It should be understood that, the base station 1 does not send any signal on the above CSI-IM resource. Therefore, for the base station 1, the CSI-IM resource corresponds to a zero power reference signal, and the base station 2 may send a signal (for example, a physical downlink shared channel (physical downlink shared channel, PDSCH) for another terminal device).

2. CSI report 2: A corresponding transmission mechanism is single-station transmission of the base station 2.

The terminal device measures, on a CSI-RS resource of the base station 2, channel information from the base station 2 to the terminal device, and measures, on a CSI-IM resource of the base station 2, interference from the base station 1 and another non-serving base station to transmission of the base station 2, to obtain a CQI when only the base station 2 serves the terminal device. It should be understood that, the base station 2 does not send any signal on the above CSI-IM resource. Therefore, for the base station 2, the CSI-IM resource corresponds to a zero power reference signal, and the base station 1 may send a signal (for example, a PDSCH for another terminal device).

3. CSI report 3: A corresponding transmission mechanism is NCJT.

In this transmission mechanism, the terminal device needs to measure inter-stream interference between the two base stations and interference from another non-serving base station to current transmission. The inter-stream interference is measured on a CSI-RS resource used by each base station to measure a channel, and the interference from the non-serving base stations is measured on a same CSI-IM resource of the two base stations. Specifically, the base station 1 sends a CSI-RS 1 at a time-frequency location of the CSI-RS 1, and the terminal device measures a channel $h_1$ from the base station 1 to the terminal device based on the CSI-RS 1. For a data stream transmitted by the base station 1, $h_1$ is a channel gain. However, for a data stream transmitted by the base station 2, h1 may cause interference. Therefore, interference power $I_1$ caused by the base station 1 to the data stream of the base station 2 may also be measured on the CSI-RS 1. Likewise, the base station 2 sends a CSI-RS 2 at a time-frequency location of the CSI-RS 2, and the terminal device may measure a channel $h_2$ from the base station 2 to the terminal device based on the CSI-RS 2, and may further obtain interference power $I_2$ caused by the base station 2 to the data stream transmitted by the base station 1. In addition, the two base stations configure a CSI-IM resource at a same time-frequency location, and neither of the two base stations sends any signal on the CSI-IM resource. The terminal device may measure, on the CSI-IM resource, interference power $I_0$ caused by transmission of the another non-serving base station to the data streams of the base station 1 and the base station 2.

Based on the above measurement results, the terminal device may calculate that an SINR of the data stream of the base station 1 is $$SINR1 = \frac{|h_1|^2}{I_2 + I_0},$$

and calculate that an SINR of the data stream of the base station 2 is $$SINR2 = \frac{|h_2|^2}{I_1 + I_0}.$$

The terminal device reports a CQI 1 and a CQI 2 to the base station based on the SINR 1 and the SINR 2. It should be understood that the above formula is merely an example described for ease of understanding, and an SINR may be alternatively calculated by using another expression. This is not limited in the embodiments of this application.

The central base station may determine, based on the above three pieces of CSI fed back by the terminal device, which base station needs be used to transmit data to the terminal device or that all base stations need to be used to transmit data to the terminal device.

However, it is assumed that one central base station may make a CSI measurement decision and a data scheduling decision for all serving base stations in the above method. For example, in the above CSI report 3, it is assumed that the base station 1 and the base station 2 obey an instruction of the central base station, and simultaneously send the CSI-RS 1 and the CSI-RS 2, so that the terminal device performs interference measurement. It is also assumed that if an NCJT transmission mechanism is used for subsequent data transmission, the base station 1 and the base station 2 certainly transmit different data streams to the terminal device simultaneously. Because sending of a CSI-RS (especially sending of an aperiodic CSI-RS) is dynamically determined, data scheduling is also dynamically determined. In the above method, the central base station still needs to know CSI information of each serving base station, and coordinate the serving base stations to serve the terminal device. A specific scheduling delay is required, and dynamic information exchange cannot be avoided. This is contrary to an original intention of reducing a delay and avoiding dynamic information exchange.

If an actual scenario is considered, that is, each serving base station does not exchange information, but independently makes a decision on sending of a CSI-RS, measurement of CSI, and data scheduling, information measured by the terminal device for each serving base station is inaccurate, thereby severely deteriorating data demodulation performance of the above multi-TRP transmission mechanism. Specifically, when the base station 1 determines to immediately perform data scheduling and enables the terminal device to report CSI at this point, the base station 1 does not know whether the base station 2 also needs to perform data scheduling in the future, or whether the base station 2 sends the CSI-RS 2 at this point. If the CQI 1 is measured in the manner of the CSI report 3, the terminal device measures the channel $h_1$ only on the CSI-RS 1 resource, and measures interference on the above CSI-IM resource. Because neither of the two base stations sends any signal on the CSI-IM resource, interference measured by the terminal device is only the interference $I_0$ caused by the another non-serving base station. If the base station 2 also schedules data when the base station 1 schedules data, an MCS of the data of the base station 1 is inaccurate because the inter-stream interference $I_2$ caused by the base station 2 to the data stream of the base station 1 is not considered.

Therefore, how to avoid dynamic information exchange and improve accuracy of a measurement result has become a technical problem that needs to be urgently resolved. To resolve the foregoing problem, an embodiment of this application provides a new channel state information reporting method.

Figure 2:
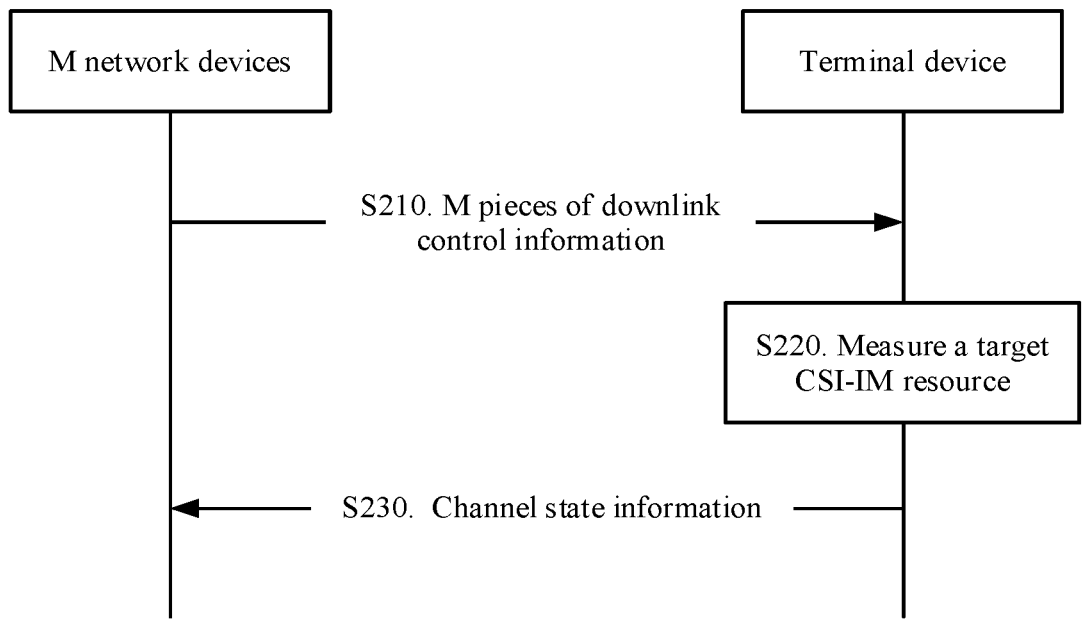
FIG. 2 is a schematic flowchart of a channel state information reporting method according to an embodiment of this application.

FIG. 2 is a schematic flowchart of a channel state information reporting method 200 according to an embodiment of this application. The method 200 may be used in the communications system 100 shown in FIG. 1. However, this embodiment of this application is not limited thereto.

S210. M network devices separately send downlink control information to a terminal device, and correspondingly, the terminal device receives M pieces of downlink control information, where first downlink control information in the M pieces of downlink control information indicates a first channel state information configuration, the first channel state information configuration is associated with a first channel state information interference measurement CSI-IM resource group, and the first CSI-IM resource group includes $N_1$ CSI-IM resources, where M and $N_1$ are positive integers, and $N_1$ is greater than 1.

S220. The terminal device measures a target CSI-IM resource, and reports channel state information, where the target CSI-IM resource is determined by the terminal device from the $N_1$ CSI-IM resources based on M, and a quantity of target CSI-IM resources is less than $N_1$.

Specifically, in a multi-TRP transmission network, the terminal device may receive downlink control information from a plurality of network devices (which may be specifically serving base stations), to trigger the terminal device to report CSI. To avoid dynamic information exchange, the CSI is measured through pre-scheduling in this embodiment of this application. The "pre-scheduling" means that a serving base station makes a semi-static agreement. To be specific, if each serving base station needs to schedule data for the terminal device at a moment t+k, the serving base station sends downlink control information at a moment t, to trigger an associated CSI report. There is a specific association relationship between CSI reports triggered by the serving base stations. A CSI report triggered by downlink control information sent by a serving base station is associated with a CSI-RS resource and a CSI-IM resource group of the serving base station. The DCI of each base station triggers only the CSI-RS resource and the CSI-IM resource associated with the CSI, and does not need to trigger a CSI-RS resource of another base station (that is, it is not necessary to make a decision for the another base station or know a decision of the another base station). In this way, serving base stations do not need to know scheduling policies and CSI measurement decisions of each other, and a delay caused by information exchange is avoided. Specifically, associated CSI reports triggered by all downlink control information may be a same CSI report, or may be CSI reports associated in a specified manner. The association relationship may be used by the terminal device to determine that the M pieces of downlink control information are associated, that is, may be used by the terminal device to select the target CSI-IM resource based on a value of M. In the present invention, a "pre-scheduling" mechanism does not impose a constraint on behavior of a base station, that is, does not force the base station to trigger CSI, send a CSI-RS, and schedule data in the above manner. However, the base station triggers the CSI and sends the CIS-RS in this manner, so that CSI measurement can be more accurate.

In this embodiment of this application, the first DCI indicates the first CSI configuration, the first CSI configuration is associated with the first CSI-IM resource group, and the first CSI-IM resource group includes the $N_1$ (greater than 2) CSI-IM resources and includes two types of CSI-IM resources: a first-type CSI-IM resource and a second-type CSI-IM resource. The two types of CSI-IM resources correspond to different transmission mechanisms, that is, are used to measure interference information in different transmission mechanisms. Therefore, the terminal device may determine, based on a quantity (M) of pieces of received DCI, whether a data transmission mechanism in the future is multi-station joint transmission or single-station transmission, to select the target CSI-IM resource from the two types of CSI-IM resources, and obtain interference information by measuring the target CSI-IM resource. Further, the terminal device may measure a CSI-RS resource to perform channel measurement.

According to the channel state information reporting method in this embodiment of this application, the terminal device determines, based on a quantity of pieces of received downlink control information, a transmission mechanism used for data transmission in the future, selects a target CSI-IM resource from at least two CSI-IM resources to perform interference measurement, and reports channel state information, to avoid dynamic information exchange and improve accuracy of a CSI measurement result, thereby improving system performance.

It should be understood that, that "the first CSI configuration is associated with the first CSI-IM resource group" means that the first CSI configuration corresponds to the first CSI-IM resource group, and when receiving DCI indicating the first CSI configuration, the terminal device may determine the corresponding first CSI-IM resource group. In other words, when one CSI IM resource group associated with a CSI configuration is used to obtain a CSI parameter of the CSI configuration, interference information is measured to determine CSI. That "the first CSI configuration is associated with the first CSI-IM resource group" may also be referred to as that "the first CSI configuration corresponds to the first CSI-IM resource group" or "the first CSI configuration is corresponding to the first CSI-IM resource group". This is not limited in this embodiment of this application.

An association relationship between a CSI configuration and a CSI-IM resource group may be configured by the network device in the CSI configuration by using higher layer signaling (for example, RRC signaling), or may be dynamically indicated by the network device by using dynamic signaling (for example, multiple access control (multiple access control, MAC) control element (CE) or DCI). This is not limited in this embodiment of this application.

It should be further understood that the above CSI-IM resources may be classified into periodic CSI-IM and aperiodic CSI-IM. Optionally, if the above CSI-IM resource is aperiodic CSI-IM, the CSI-IM resource is triggered by the network device by using dynamic signaling (for example, a MAC CE or DCI). Optionally, if the above CSI-IM resource is a periodic CSI-IM resource, the CSI-IM resource does not need to be triggered by using dynamic signaling after being configured by using higher layer signaling. The dynamic signaling may trigger only a CSI report. The terminal device may determine an associated CSI-IM resource based on a configuration of the CSI report, and directly perform interference measurement on the periodic CSI-IM resource. Optionally, if the above CSI-IM resource is a periodic CSI-IM resource, after the CSI-IM resource is configured by using higher layer signaling, the CSI-IM resource may be further triggered by sending dynamic signaling by the network device.

In an optimal embodiment, the $N_1$ CSI-IM resources include a first-type CSI-IM resource and a second-type CSI-IM resource, the first-type CSI-IM resource is used to measure interference information in a multi-station joint transmission mechanism, and the second-type CSI-IM resource is used to measure interference information in a single-station transmission mechanism.

Specifically, if the terminal device determines, based on M, that data is to be transmitted by using the multi-station joint transmission mechanism in the future, the terminal device may determine the first-type CSI-IM resource as the target CSI-IM resource. If the terminal device determines, based on M, that data is to be transmitted by using the single-station transmission mechanism in the future, the terminal device may determine the second-type CSI-IM resource as the target CSI-IM resource. The single-station transmission mechanism may be a DPS mechanism, and the multi-station joint transmission mechanism may be an NCJT mechanism.

In a possible implementation, for example, the terminal device has two serving base stations: a base station 1 and a base station 2, or in other words, n=2.

1. If the terminal device receives one piece of DCI (DCI 1) from the base station 1, the terminal device determines that only the base station 1 schedules data for the terminal device at a moment t+k, and the terminal device determines that the single-station transmission mechanism is used for data transmission in the future, determines a CSI-RS resource measurement channel from a CSI configuration 1 indicated by the DCI 1, determines a target CSI-IM resource for interference measurement, obtains CSI in single-station transmission, and reports the CSI to the base station 1.

Optionally, a base station from which the DCI 1 specifically comes may be invisible to the terminal device. In other words, the terminal device only needs to determine, based on the DCI 1, a triggered CSI configuration, and a CSI-RS resource and a CSI-IM resource associated with the CSI configuration, to measure channel information and interference information on a corresponding time-frequency resource and to determine CSI, and therefore does not need to know a base station from which the DCI 1 comes.

2. If the terminal device receives two pieces of DCI (DCI 1 and DCI 2), and the two pieces of DCI trigger a same CSI configuration or an associated CSI configuration, the terminal device determines that the NCJT mechanism is used for data transmission in the future, and the terminal device determines, from a CSI configuration 1 indicated by the DCI 1, a CSI-RS resource associated with the CSI configuration 1, measures channel information of the base station 1, determines, from a CSI configuration 2 indicated by the DCI 2, a CSI-RS resource associated with the CSI configuration 2, measures channel information of the base station 2, selects a target CSI-IM resource from a CSI-IM resource group associated with the CSI configuration 1 and/or a CSI-IM resource group associated with the CSI configuration 2, and measures interference from another non-serving base station. In addition, the terminal device may measure inter-stream interference from the base station 1 to transmission of the base station 2 on the CSI-RS resource associated with the CSI configuration 1, and measure interstream interference from the base station 2 to transmission of the base station 1 on the CSI-RS resource associated with the CSI configuration 2. The terminal device obtains CSI 1 and CSI 2 based on channel information and interference information, and reports the CSI 1 and the CSI 2 to the base station. Optionally, the terminal device may report both the CSI 1 and the CSI 2 to the base station 1 and the base station 2, or may report the CSI 1 to the base station 1 and report the CSI 2 to the base station 2. This is not limited in this embodiment of this application.

In an optional embodiment, a $j^{th}$ CSI-IM resource in the $N_1$ CSI-IM resources is predefined as the first-type CSI-IM resource or the second-type CSI-IM resource; or the method further includes:

The terminal device receives third indication information, where the third indication information is used to indicate that the $j^{th}$ CSI-IM resource in the $N_1$ CSI-IM resources is the first-type CSI-IM resource or the second-type CSI-IM resource, where $j \in \{1, \ldots, N_1\}$.

Specifically, the first-type CSI-IM resource and the second-type CSI-IM resource in the $N_1$ CSI-IM resources may be predefined, or may be determined according to a predefined rule. For example, a CSI-IM resource whose resource index is an odd number is a first-type CSI-IM resource, and a CSI-IM resource whose resource index is an even number is a second-type CSI-IM resource. For another example, the first p CSI-IM resources are first-type CSI-IM resources and the last q CSI-IM resources are second-type CSI-IM resources in ascending order of resource indexes. For another example, the first p CSI-IM resources are second-type CSI-IM resources and the last q CSI-IM resources are first-type CSI-IM resources in ascending order of resource indexes, where both p and q are positive integers less than $N_1$.

The first-type CSI-IM resource and the second-type CSI-IM resource in the $N_1$ CSI-IM resources may be alternatively configured by the network device for the terminal device by using the third indication information. For example, one bit is used to indicate the $j^{th}$ CSI-IM resource in the $N_1$ CSI-IM resources, 0 indicates that the resource is the first-type CSI-IM resource, and 1 indicates that the resource is the second-type CSI-IM resource, where j is an integer greater than or equal to 1 and less than or equal to $N_1$. For another example, one piece of indication information is used for the $j^{th}$ CSI-IM resource. If the indication information is configured, it indicates that the resource is the first-type CSI-IM resource; or if the indication information is not configured, it indicates that the resource is the second-type CSI-IM resource, where j is an integer greater than or equal to 1 and less than or equal to $N_1$. However, this is not limited in this embodiment of this application.

In an optional embodiment, the first channel state information configuration is further associated with K channel state information reference signal CSI-RS resources, and at least one of the K CSI-RS resources is associated with $N_1$' of the $N_1$ CSI-IM resources, where K is a positive integer, and $1 < N_1' \leq N_1$.

Specifically, the first CSI configuration is further associated with the K CSI-RS resources, and the K CSI-RS resources are used by the terminal device to measure channel information. One CSI-RS resource is associated with at least two CSI-IM resources.

It should be understood that, that one CSI-RS resource is associated with at least two CSI-IM resources means that when the CSI-RS resource is used to measure channel information, the terminal device measures at least one target CSI-IM resource in the CSI-IM resources associated with the CSI-RS resource, to determine corresponding interference information. The channel information and the interference information are used to determine reported CSI, and may be specifically used to determine a CQI in the CSI. The target CSI-IM resource may be determined based on M.

Figure 3:
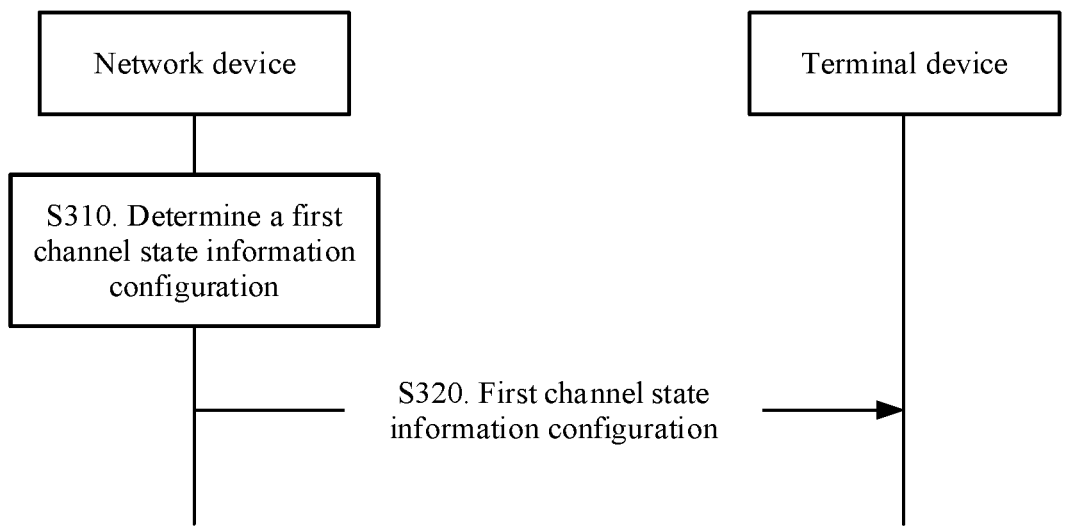
FIG. 3 is a schematic flowchart of another channel state information reporting method according to an embodiment of this application.

A CSI configuration may be determined by the network device and sent to the terminal device. Taking the first CSI configuration as an example, the first CSI configuration may be configured for the terminal device by a network device that sends the first downlink control information, or may be sent by another network device to the terminal device. A specific procedure is shown in FIG. 3.

S310. A network device determines a first channel state information configuration, where the first channel state information configuration is associated with K channel state information reference signal CSI-RS resources and $N_1$ channel state information interference measurement CSI-IM resources, and at least one of the K CSI-RS resources is associated with $N_1$' of the $N_1$ CSI-IM resources, where K and $N_1$ are positive integers, and $1 < N_1' \leq N_1$.

S320. The network device sends the first channel state information configuration to a terminal device, and correspondingly, the terminal device receives the first channel state information configuration.

It should be understood that a configuration method of another CSI configuration (for example, a second CSI configuration) is the same as a configuration method of the first CSI configuration. Details are not described herein again.

In an embodiment, when $M \geq 2$, second downlink control information in the M pieces of downlink control information indicates a second channel state information configuration, the second channel state information configuration is associated with a second CSI-IM resource group, the second CSI-IM resource group includes $N_2$ CSI-IM resources, and there is an association relationship between the first channel state information configuration and the second channel state information configuration, where $N_2$ is a positive integer.

Specifically, if the terminal device receives at least two pieces of downlink control information sent by at least two network devices, and CSI configurations indicated by the at least two pieces of downlink control information are associated, it indicates that the at least two network devices need to schedule the terminal device at a same moment to perform data transmission. The first DCI indicates the first CSI configuration, the second DCI indicates the second CSI configuration, the first CSI configuration is associated with the $N_1$ CSI-IM resources, the second CSI configuration is associated with the $N_2$ CSI-IM resources, and there is an association relationship between the first CSI configuration and the second CSI configuration.

It should be understood that the association relationship specifically means that both the first CSI configuration and the second CSI configuration may be used for multi-TRP transmission. The association relationship may be implemented in a plurality of manners. This is not limited in this embodiment of this application.

In an embodiment, the first channel state information configuration is the same as the second channel state information configuration.

Specifically, content of the first CSI configuration and the second CSI configuration may be totally the same. It should be understood that, that the first CSI configuration is the same as the second CSI configuration may mean that resources associated with the first CSI configuration and the second CSI configuration are totally the same, or may mean that the second CSI configuration is the first CSI configuration. If the second CSI configuration is the first CSI configuration, in a possible implementation, the first CSI configuration is further associated with the $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

It should be understood that the content of the first CSI configuration and the second CSI configuration may be alternatively different. In this case, the first CSI configuration and the second CSI configuration may separately configure different report content. For example, the first CSI configuration is used to report at least one of a rank indication (RI), a type I (Type I) precoding matrix indicator (PMI), and a channel quality indicator (CQI), and the second CSI configuration is used to report at least one of an RI, a type II PMI, and a CQI. For another example, the PMI in the first CSI configuration is a codebook based on 16 ports, and the PMI in the second CSI configuration is a codebook based on 32 ports. This is not limited in this embodiment of this application. Parameters of the two CSI configurations are not totally the same, and may be more flexible, and therefore are more applicable to different situations such as antenna structures and processing capabilities of different base stations in an actual system.

If the first CSI configuration and the second CSI configuration are different, the network device may indicate the association relationship between the first CSI configuration and the second CSI configuration by using first indication information and/or fourth indication information. The first indication information and/or the fourth indication information may be carried in radio resource control (RRC) signaling, or may be carried in DCI. This is not limited in this embodiment of this application.

In an optional embodiment, the first channel state information configuration carries first indication information, or the first downlink control information carries the first indication information, and the first indication information is used to indicate that the first channel state information configuration is associated with the second channel state information configuration.

Specifically, the first indication information may indicate, by indicating an index of the second channel state information configuration, that the first channel state information configuration is associated with the second channel state information configuration.

In an embodiment, the second channel state information configuration carries fourth indication information, or the second downlink control information carries the fourth indication information, and the fourth indication information is used to indicate that the second channel state information configuration is associated with the first channel state information configuration.

Specifically, the fourth indication information may indicate, by indicating an index of the first channel state information configuration, that the second channel state information configuration is associated with the first channel state information configuration.

In one embodiment, the first CSI configuration and/or the second CSI configuration include/includes one field (to be specific, the first indication information and/or the fourth indication information), separately indicating identifiers (for example, IDs) of each other. The terminal device may determine, depending on whether the first CSI configuration and the second CSI configuration include the above field, whether there is an association relationship between the first CSI configuration and the second CSI configuration. If there is an association relationship between the first CSI configuration and the second CSI configuration, the terminal device may perform measurement for NCJT or single-station transmission. In this case, the first indication information and/or the fourth indication information may be sent to the terminal device by using RRC signaling.

In one embodiment, the first DCI and/or the second DCI include/includes one field (to be specific, the first indication information and/or the fourth indication information), separately indicating identifiers (for example, IDs) of the second CSI configuration and/or the first CSI configuration. The terminal device may determine, depending on whether the first DCI and the second DCI include the above field, whether there is an association relationship between the first CSI configuration and the second CSI configuration. If there is an association relationship between the first CSI configuration and the second CSI configuration, the terminal device may perform measurement for NCJT or single-station transmission. In this case, the first indication information and/or the fourth indication information are/is sent to the terminal device by using DCI.

In an embodiment, the first channel state information configuration and the second channel state information configuration are used for a same transmission mechanism set, and the transmission mechanism set includes a multi-station joint transmission mechanism and a single-station transmission mechanism.

Specifically, a network device that sends the first DCI may send second indication information, and the terminal device receives the second indication information, where the second indication information indicates that the first channel state configuration is used for the multi-station joint transmission mechanism or the single-station transmission mechanism. A network device that sends the second DCI may send fifth indication information, and the terminal device receives the fifth indication information, where the fifth indication information indicates that the second channel state configuration is used for the multi-station joint transmission mechanism or the single-station transmission mechanism.

In this embodiment of this application, the network device may further indicate the association relationship between the first CSI configuration and the second CSI configuration by using the second indication information and/or the fifth indication information. The second indication information and/or the fifth indication information may be carried in RRC signaling, or may be carried in DCI. This is not limited in this embodiment of this application.

In one embodiment, the first CSI configuration and the second CSI configuration each include one field (to be specific, the second indication information and the fifth indication information), indicating that the CSI configuration is used for multi-TRP transmission (the multi-station joint transmission mechanism or the single-station transmission mechanism). The terminal device may determine, depending on whether the first CSI configuration and the second CSI configuration include the above field, whether there is an association relationship between the first CSI configuration and the second CSI configuration. If both the first CSI configuration and the second CSI configuration triggered by the first DCI and the second DCI include the field, and the field indicates that the CSI configuration is used for multi-TRP transmission, the terminal device may perform measurement for NCJT or single-station transmission. In this case, the second indication information and/or the fifth indication information may be sent to the terminal device by using RRC signaling. The network device may specifically enable the above field to use a specific value (for example, 0 or 1) to indicate a multi-TRP transmission manner.

In one embodiment, the first DCI and the second DCI each include one field (to be specific, the second indication information and the fifth indication information), indicating that the CSI configuration indicated by the DCI is used for multi-TRP transmission (the multi-station joint transmission mechanism or the single-station transmission mechanism). The terminal device may determine, depending on whether the first DCI and the second DCI include the above field, whether there is an association relationship between the first CSI configuration and the second CSI configuration. If both the first DCI and the second DCI include the field, and the field indicates that the CSI configuration is used for multi-TRP transmission, it indicates that the first CSI configuration and the second CSI configuration have an association relationship and are used for multi-TRP transmission, and the terminal device may perform measurement for NCJT or single-station transmission. In this case, the second indication information and/or the fifth indication information may be sent to the terminal device by using DCI signaling. The network device may specifically enable the above field to use a specific value (for example, 0 or 1) to indicate a multi-TRP transmission manner.

In an embodiment, the first downlink control information indicates at least one of the following: the first channel state information configuration, the at least one CSI-RS resource, and the $N_1$ CSI-IM resources. In addition, the first indication information does not indicate the $N_2$ CIS-IM resources.

In an embodiment, at least one first CSI-IM resource exists in the $N_1$ CSI-IM resources, the first CSI-IM resource and at least one of the $N_2$ CSI-IM resources occupy a same time-frequency resource, at least one second CSI-IM resource exists in the $N_1$ CSI-IM resources, and the second CSI-IM resource and all of the $N_2$ CSI-IM resources occupy different time-frequency resources.

Specifically, the $N_1$ CSI-IM resources and the $N_2$ CSI-IM resources include at least one first CSI-IM resource that occupies a same time-frequency resource, which is also referred to as a "same CSI-IM resource" in this specification. The $N_1$ CSI-IM resources and the $N_2$ CSI-IM resources further include at least one second CSI-IM resource that occupies different time-frequency resources, which is also referred to as "different CSI-IM resources" in this specification.

It should be understood that one time-frequency resource may be one resource element (RE), and is determined by using one orthogonal frequency division multiplexing (OFDM) symbol and one subcarrier.

In an embodiment, the first CSI-IM resource is the first-type CSI-IM resource, and the second CSI-IM resource is the second-type CSI-IM resource.

In other words, the above same CSI-IM resource is the first-type CSI-IM resource that is used to measure the interference information in the multi-station joint transmission mechanism, and the above different CSI-IM resources are the second-type CSI-IM resource that is used to measure the interference information in the single-station transmission mechanism.

In an optional embodiment, a resource element (RE) occupied by the first-type CSI-IM resource is not used to send a downlink shared channel.

In an optional embodiment, if the network device sends, to the terminal device in a first time unit, the first downlink control information that indicates the first channel state information configuration, in a second time unit indicated by the first downlink control information, a resource element (RE) occupied by the second-type CSI-IM resource is not used to send a downlink shared channel.

Specifically, each network device (for example, a serving base station) serving the terminal device performs rate matching for downlink data on a first-type CSI-IM resource of the network device, that is, does not send a downlink shared channel on an RE occupied by the resource. At a moment t, if a network device sends downlink control information to the terminal device to trigger the above CSI configuration used for multi-TRP measurement, the network device performs rate matching on a second-type CSI-IM resource of the network device at a moment t+k, that is, does not send a downlink shared channel on an RE occupied by the resource.

Taking a plurality of serving base stations as an example, because the first-type CSI-IM resource is the above same CSI-IM resource, the plurality of serving base stations perform rate matching on the first-type CSI-IM resource, and the first-type CSI-IM resource may be used by the terminal device to measure interference from another non-serving base station. Because the second-type CSI-IM resource is the above different CSI-IM resources, only one specific serving base station performs rate matching on the second-type CSI-IM resource, and the second-type CSI-IM resource may be used by the terminal device to measure interference from another non-serving base station and a serving base station other than the specific serving base station.

In an embodiment, when M=1, the target CSI-IM resource is the second-type CSI-IM resource.

Specifically, when the terminal device receives only one piece of downlink control information, the terminal device may determine that the single-station transmission mechanism is to be used for data transmission in the future, and determine that the target CSI-IM resource is the second-type CSI-IM resource, namely, the above different CSI-IM resources. Optionally, the downlink control information triggers one CSI report, and the CSI report is measured for a multi-TRP transmission mechanism.

In one embodiment, when M=1, the terminal device measures interference information on the determined target CSI-IM resource, determines the channel state information based on the obtained interference information, and reports the channel state information. The obtained interference information includes interference from another non-serving base station.

Because there is a specific missing detection probability of downlink control information, it is assumed that a base station 1 and a base station 2 respectively send DCI 1 and DCI 2 to trigger a same CSI report. This means that NCJT transmission is to be performed at the moment t+k. However, if the terminal device misses detecting the DCI 2 and detects only the DCI 1, the terminal device considers that the single-station transmission mechanism needs to be used. In this case, the terminal device measures interference on the second-type CSI-IM resource, and obtained interference information includes interference from another non-serving base station and the base station 2, to improve accuracy of a CSI report, thereby improving subsequent data transmission performance.

In an embodiment, when M≥2, the target CSI-IM resource is the first-type CSI-IM resource; or when M≥2, the target CSI-IM resource is the first-type CSI-IM resource or the second-type CSI-IM resource.

Specifically, when the terminal device receives at least two pieces of downlink control information at the moment t, the terminal device may determine that a data transmission mechanism at the moment t+k is NCJT, and determine the first-type CSI-IM resource as the target CSI-IM resource. The terminal device may also determine a transmission mechanism set, where the transmission mechanism set includes single-station transmission and NCJT corresponding to each base station. The terminal device may separately measure CSI for one or more transmission mechanisms, determine a target transmission mechanism, and report CSI in the transmission mechanism. In one embodiment, the terminal device may alternatively report one piece of indication information to the network device to indicate a target transmission mechanism corresponding to currently reported CSI. In this case, the corresponding target CSI-IM resource may be the first-type CSI-IM resource or the second-type CSI-IM resource. This depends on the target transmission mechanism determined by the terminal device.

In one embodiment, when M≥2, the target CSI-IM resource is the first-type CSI-IM resource, and the terminal device measures interference information on the target CSI-IM resource and all or a part of CSI-RS resources that are indicated by downlink control information in the M pieces of downlink control information except the first downlink control information, determines the channel state information based on the obtained interference information, and reports the channel state information. In this case, interference information obtained by the terminal device through measurement on the target CSI-IM resource is interference from another non-serving base station, and interference information obtained by the terminal device through measurement on all or a part of CSI-RS resources that are indicated by downlink control information other than the first downlink control information is inter-stream interference from another serving base station.

In one embodiment, when M≥2, and the target CSI-IM resource is the first-type CSI-IM resource, the terminal device measures interference information on the target CSI-IM resource and all or a part of CSI-RS resources that are indicated by downlink control information in the M pieces of downlink control information except the first downlink control information, determines the channel state information based on the obtained interference information, and reports the channel state information; and/or when M≥2 and the target CSI-IM resource is the second-type CSI-IM resource, the terminal device measures interference information on the target CSI-IM resource, determines the channel state information based on the obtained interference information, and reports the channel state information.

In an embodiment, the first CSI-IM resource group occupies X sub-bands, and a target CSI-IM resource on an $x^{th}$ sub-band in the X sub-bands is determined by the terminal device based on a quantity of CSI-IM resource groups that occupy the $x^{th}$ sub-band in CSI-IM resource groups indicated by the M pieces of downlink control information, where X is a positive integer, and $x \in \{1, 2, \ldots, X\}$.

Specifically, CSI-IM resources sent by two network devices may occupy different sub-bands. Therefore, even if a quantity of pieces of DCI received by the terminal device is greater than or equal to 2, the terminal device needs to determine a transmission mechanism based on a quantity of CSI-IM resource groups on each sub-band. If CSI-IM resource groups triggered by two or more pieces of DCI exist on a sub-band, a data transmission mechanism on the sub-band is NCJT. If a CSI-IM resource group triggered by only one piece of DCI exists on a sub-band, a data transmission mechanism on the sub-band is single-station transmission.

For example, M=2 and two pieces of downlink control information separately indicate two CSI-IM resource groups, where the first CSI-IM resource group occupies a sub-band 1 and a sub-band 2, and the second CSI-IM resource group occupies the sub-band 2 and a sub-band 3. Therefore, because a quantity of CSI-IM resource groups that occupy the sub-band 1 is 1, a transmission mechanism corresponding to the sub-band 1 is single-station transmission, and a corresponding target CSI-IM resource is the second-type CSI-IM resource. Likewise, a transmission mechanism corresponding to the sub-band 3 is single-station transmission, and a corresponding target CSI-IM resource is the second-type CSI-IM resource. A quantity of CSI-IM resource groups on the sub-band 2 is 2, a transmission mechanism corresponding to the sub-band 2 is NCJT, and a corresponding target CSI-IM resource is the first-type CSI-IM resource.

According to the channel state information reporting method in this embodiment of this application, a target CSI-IM resource on each sub-band can be determined for different sub-bands, and a transmission mechanism used for data transmission in the future is determined at a finer granularity, so that a CSI measurement result is more accurate.

For ease of understanding, the following describes this application in detail with reference to specific embodiments.

It is assumed that n=2 represents a quantity of base stations that may provide a multi-TRP service for the terminal device, and a base station 1 and a base station 2 are specifically included. Optionally, the base station 1 may uniformly send radio resource control (radio resource control, RRC) signaling to the terminal device, and configure related information of all CSI reports. Optionally, the base station 1 and the base station 2 may separately send RRC signaling to the terminal device, and separately configure related information of respective CSI reports.

The following uses an example in which the base station 1 configures related information of all CSI reports for description.

First, the terminal device may receive RRC signaling from the base station 1, and the RRC signaling is used to configure a CSI report for multi-TRP transmission. The CSI configuration includes the following:

1. Content of the CSI report, for example, one or more of an RI, a PMI, and a CQI, is included.

2. A frequency domain granularity of the CSI report, for example, a broadband report or a sub-band report, is included.

3. Indication information of n NZP CSI-RS resource configurations used to measure a channel during CQI calculation is included. Indication information of each NZP CSI-RS resource configuration may be used to determine one NZP CSI-RS resource configuration. The n NZP CSI-RS resource configurations separately correspond to n serving base stations. In this embodiment, the n NZP CSI-RS resource configurations are separately referred to as an NZP CSI-RS resource configuration 1 (corresponding to the base station 1) and an NZP CSI-RS resource configuration 2 (corresponding to the base station 2). One NZP CSI-RS resource configuration indicates K associated NZP CSI-RS resources. For example, K=1.

4. Indication information of m CSI-IM resource configurations used to measure interference during CQI calculation is included. Indication information of one CSI-IM resource configuration may be used to determine one CSI-IM resource configuration, and the CSI-IM resource configuration may indicate the following information: configuration parameters of L CSI-IM resources, where L>1. One of the L CSI-IM resources is associated with one of the n NZP CSI-RS resource configurations. In addition, $m_1$ CSI-IM resources occupy a same time-frequency resource. In this specification, the $m_1$ CSI-IM resources are referred to as "same CSI-IM resources", where $m_1$ is an integer greater than 1.

It should be understood that, that "a CSI-IM resource is associated with an NZP CSI-RS resource configuration" means that when the terminal device calculates a CQI, if (all or a part of) NZP CSI-RS resources in the $i^{th}$ NZP CSI-RS resource are selected to measure channel information, (all or a part of) CSI-IM resources associated with the $i^{th}$ NZP CSI-RS resource are selected to measure interference information, and then the CQI is obtained based on the channel information and the interference information (and/or other information).

In the above L CSI-IM resources, $L_1$ CSI-IM resources are first-type CSI-IM resources and are used to measure interference information based on a first-type interference hypothesis (for example, an interference hypothesis corresponding to the multi-station joint transmission mechanism), and $L_2$ CSI-IM resources are second-type CSI-IM resources and are used to measure interference information based on a second-type interference hypothesis (for example, an interference hypothesis corresponding to the single-station transmission mechanism). Therefore, $L \geq L_1 + L_2$. The above "same CSI-IM resource" belongs to the first-type CSI-IM resource.

In one embodiment, whether a CSI-IM resource is a first-type CSI-IM resource or a second-type CSI-IM resource may be indicated in the above CSI-IM resource configuration. For example, a dedicated field is used to indicate a type of the CSI-IM resource.

It should be understood that an association relationship between a CSI-IM resource configuration and an NZP CSI-RS resource configuration may be configured in a plurality of manners. This is not limited in this embodiment of this application.

In one embodiment, the above association relationship may be configured by the base station by using RRC signaling, that is, a CSI configuration indicates the association information, or the CSI-IM resource configuration indicates the association information.

In one embodiment, the above association relationship may be dynamically established by the base station by using DCI. In this case, when receiving the above CSI configuration, the terminal device does not know which CSI-IM resource configuration in the n CSI-IM resource configurations is associated with which NZP CSI-RS resource configuration. After the terminal device receives DCI for triggering the CSI, the terminal device may dynamically establish the association relationship based on the DCI.

Figure 4:
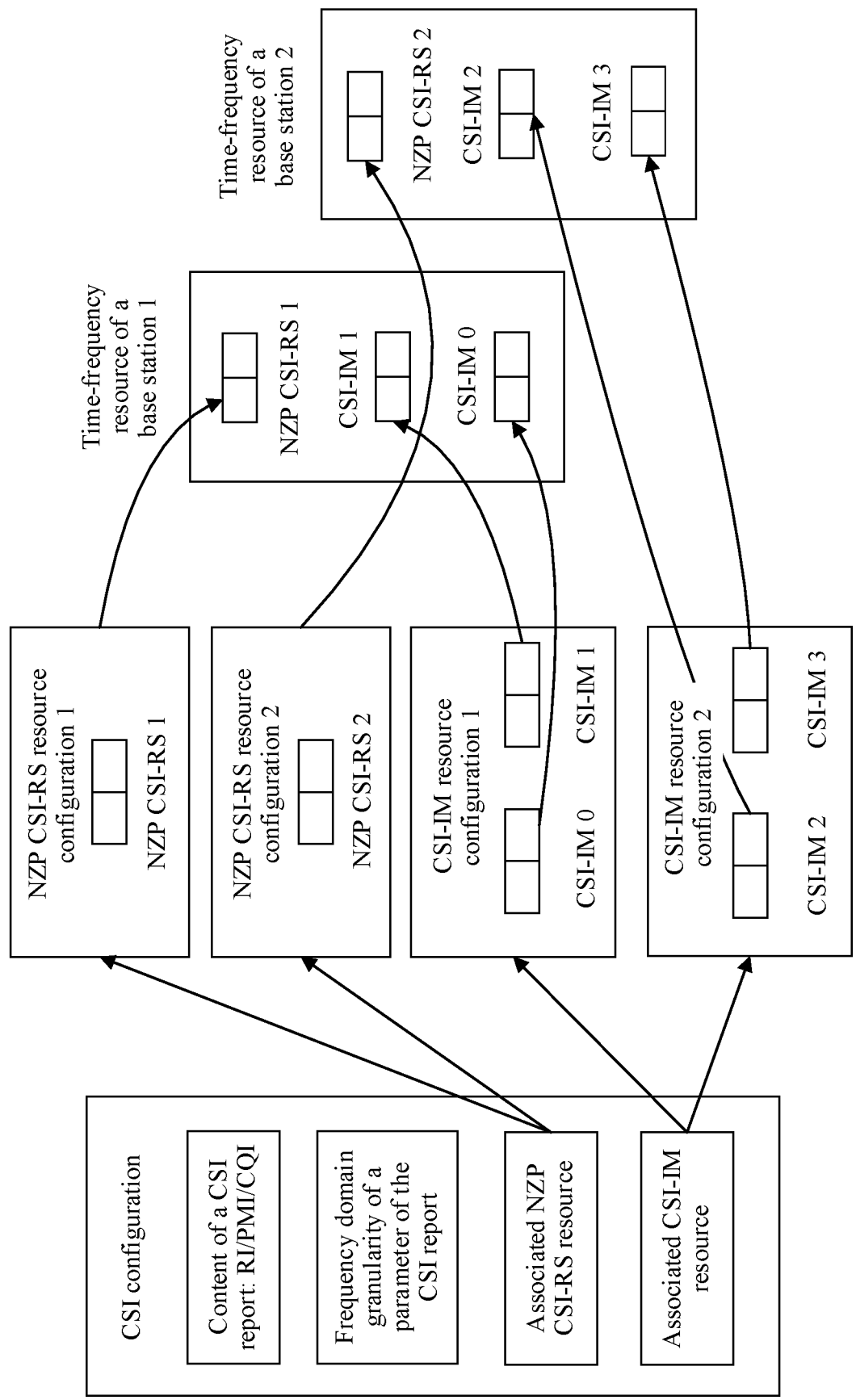
FIG. 4 is a schematic diagram of an association relationship between a channel state information configuration and a resource according to an embodiment of this application.

In one embodiment, m=n. For example, when n=2 and K=1, m=2, and L=2. In L=2 CSI-IM resources, one CSI-IM resource is used to measure all interference information in single-station transmission, namely, a second-type CSI-IM resource, and the other CSI-IM resource is used to measure interference information from transmission of a non-serving base station other than the two base stations in dual-base station joint transmission, namely, a first-type CSI-IM resource. As shown in FIG. 4, in this embodiment, m=2 CSI-IM resource configurations configured for the above CSI configuration are separately referred to as a CSI-IM resource configuration 1 (including L=2 CSI-IM resources, which are CSI-IM 0 and CSI-IM 1) and a CSI-IM resource configuration 2 (including L=2 CSI-IM resources, which are CSI-IM 2 and CSI-IM 3). The CSI-IM 0 and the CSI-IM 2 occupy a same time-frequency resource, and are the above "same CSI-IM resources", namely, the above first-type CSI-IM resource, and the CSI-IM 1 and the CSI-IM 3 occupy different time-frequency resources, namely, the above second-type CSI-IM resource.

In one embodiment, the base station may configure the CSI-IM 0 and the CSI-IM 2 as one CSI-IM resource, where the CSI-IM resource has one CSI-IM ID, or may configure the CSI-IM 0 and the CSI-IM 2 as two CSI-IM resources, where the two CSI-IM resources separately have different CSI-IM IDs and/or other parameters, but occupy a same time-frequency resource. This is not limited in this embodiment of this application.

The terminal device receives DCI sent by the base station 1 and/or the base station 2 at a moment t. It should be understood that the DCI indicates a same CSI configuration. According to the above "pre-scheduling" mechanism, if a base station sends DCI at the moment t, it indicates that the base station prepares to schedule data at a moment t+k. If the base station does not prepare to schedule data, DCI indicating the above CSI configuration is not sent to the terminal device at the moment t.

After receiving the DCI sent by the base station 1 and/or the base station 2, the terminal device may directly determine a transmission scheme based on a quantity of pieces of DCI, to be specific, single-station transmission (transmission with the base station 1 or transmission with the base station 2) or NCJT (joint transmission with the base station 1 and the base station 2), or may recommend a transmission scheme to the base station based on measured CSI. If only one base station determines to schedule data, the terminal device determines that a possible transmission mechanism is only single-station transmission, and the terminal device may measure CSI only for the transmission mechanism. If the two base stations expect to schedule data, the terminal device may determine that a transmission mechanism includes: transmission with the base station 1, transmission with the base station 2, and NCJT. The terminal device may measure CSI of the two base stations, and determine whether serving by one base station or serving by two base stations is better, that is, determine whether single-station transmission or NCJT is better. The following separately describes the foregoing possible implementations in detail.

Embodiment 1

The terminal device determines a target CSI-IM resource based on a quantity of pieces of received DCI, to calculate a CQI. This embodiment of this application may include the following three cases:

1. The terminal device receives only the DCI 1 sent by the base station 1.

Specifically, the terminal device receives only the DCI 1 sent by the base station 1, and a field (for example, a CSI request field) in the DCI 1 indicates the above CSI configuration, indicating that the base station 1 triggers the terminal device to report the above CSI. The field further indicates, from two NZP CSI-RS resource configurations associated with the CSI, an ID of an NPZ CSI-RS configuration and an ID of a CSI-IM configuration that are used for reporting the CSI, for example, a CSI-RS resource configuration 1 and a CSI-IM resource configuration 1.

The terminal device receives only the DCI 1 sent by the base station 1, meaning that only the base station 1 prepares to schedule data for the terminal device at a moment t+k. Therefore, the terminal device may perform measurement according to a single-base station transmission mechanism and report CSI. In this case, the terminal device needs to measure interference from all base stations except the base station 1. In L=2 CSI-IM resources of the CSI-IM configuration 1, CSI-IM 1 is a second-type CSI-IM resource that is used for measurement in single-base station transmission. Therefore, the terminal device may select the CSI-IM 1 as the target CSI-IM resource to measure required interference.

In addition, the terminal device may measure an NZP CSI-RS resource (NZP CSI-RS 1) in the NZP CSI-RS resource configuration 1 triggered by the DCI 1, and use the NZP CSI-RS resource as a target CSI-RS resource to measure a channel. The terminal device may determine and report the CQI based on measured channel information and interference information.

From a perspective of the base station 1, when the base station 1 sends the DCI 1 to trigger the above CSI report, and triggers the NZP CSI RS resource configuration 1 and the CSI-IM resource configuration 1, the base station 1 sends a corresponding NZP CSI-RS, and performs rate matching on CSI-IM 0 and CSI-IM 1 included in the CSI-IM resource configuration 1, that is, sends no data to any terminal device on REs of the two resources, so that the terminal device can accurately measure, on the resource, interference from sending of data and/or a reference signal by another base station.

Because base stations (including the base station 2 and another non-serving base station) other than the base station 1 does not necessarily perform rate matching on the CSI-IM 1 resource, the terminal device may measure, on the CSI-IM 1 resource, interference from the base stations other than the base station 1. Therefore, when the terminal device receives only the DCI 1, the terminal device selects the CSI-IM 1 as the target CSI-IM resource to measure interference information. Therefore, the terminal device may predict an interference hypothesis for future data based on a quantity of pieces of DCI, to dynamically select the target CSI-IM resource from the associated CSI-IM resource configuration, so that corresponding interference information can be accurately obtained, and an accurate CQI can be calculated. Further, the terminal device may report the CQI to the base station 1.

2. The terminal device receives only the DCI 2 sent by the base station 2.

Specifically, the terminal device receives only the DCI 2 sent by the base station 2, and a field (for example, a CSI request field) in the DCI 2 indicates the above CSI configuration, indicating that the base station 2 triggers the terminal device to report the above CSI. The field further indicates, from two NZP CSI-RS resource configurations associated with the CSI, an ID of an NPZ CSI-RS resource configuration and an ID of a CSI-IM resource configuration that are used for reporting the CSI, for example, a CSI-RS resource configuration 2 and a CSI-IM resource configuration 2.

The terminal device receives only the DCI 2 sent by the base station 2, meaning that only the base station 2 prepares to schedule data for the terminal device at a moment t+k. Therefore, the terminal device may perform measurement according to a single-base station transmission mechanism and report CSI. In this case, the terminal device needs to measure interference from all base stations except the base station 2. In L=2 CSI-IM resources of the CSI-IM configuration 2, CSI-IM 3 is a second-type CSI-IM resource that is used for measurement in single-base station transmission. Therefore, the terminal device may select the CSI-IM 3 as the target CSI-IM resource to measure required interference.

In addition, the terminal device may measure an NZP CSI-RS resource (NZP CSI-RS 2) in the NZP CSI-RS resource configuration 2 triggered by the DCI 2, and use the NZP CSI-RS resource as a target CSI-RS resource to measure a channel. The terminal device may calculate, by using measured channel information and interference information, a CQI when the base station 2 schedules data for the terminal device, and report the CQI to the base station.

From a perspective of the base station 2, when the base station 2 sends the DCI 2 to trigger the above CSI report, and triggers the NZP CSI RS resource configuration 2 and the CSI-IM resource configuration 2, the base station 2 sends a corresponding NZP CSI-RS, and performs rate matching on CSI-IM 2 and the CSI-IM 3 included in the CSI-IM resource configuration 2, that is, sends no data to any terminal device on REs of the two resources, so that the terminal device can measure, on the resource, interference from sending of data and/or a reference signal by another base station.

Because base stations (including the base station 1 and another non-serving base station) other than the base station 2 does not necessarily perform rate matching on the CSI-IM 3 resource, the terminal device may measure, on the CSI-IM 3 resource, interference from the base stations other than the base station 3. Therefore, when the terminal device receives only the DCI 2, the terminal device selects the CSI-IM 3 as the target CSI-IM resource to measure interference information. Therefore, the terminal device may predict an interference hypothesis for future data based on a quantity of pieces of DCI, to dynamically select the target CSI-IM resource from the associated CSI-IM resource configuration, so that corresponding interference information can be accurately obtained, and an accurate CQI can be calculated. Further, the terminal device may report the CQI to the base station 2.

3. The terminal device receives the DCI 1 of the base station 1 and the DCI 2 of the base station 2.

Specifically, the terminal device receives the DCI 1 of the base station 1 and the DCI 2 of the base station 2, and both the DCI 1 and the DCI 2 indicate the above CSI configuration. In addition, the DCI 1 further indicates an NZP CSI-RS resource configuration 1 and a CSI-IM resource configuration 1, and the DCI 2 further indicates an NZP CSI-RS resource configuration 2 and a CSI-IM resource configuration 2.

The terminal device receives two pieces of DCI, meaning that the base station 1 and the base station 2 simultaneously schedule data for the terminal device at a moment t+k, but schedule different data streams. Therefore, the terminal device needs to separately measure CSI for different data streams.

(1) When measuring the CSI for the base station 1, the terminal device may perform channel measurement on an NZP CSI-RS resource included in the NZP CSI-RS resource configuration 1, and interference information includes two parts: inter-stream interference from the base station 2 to the base station 1 and interference from a base station other than the base station 1 and the base station 2 to the base station 1. The first-type interference may be measured on an NZP CSI-RS resource (NZP CSI-RS 2) included in the NZP CSI-RS resource configuration 2, and the base station 1 and the base station 2 need to be excluded for the second-type interference. Therefore, measurement needs to be performed on a same CSI-IM resource (a first-type CSI-IM resource), to be specific, CSI-IM 0. Through such measurement, the terminal device may obtain a CQI 1 of a data stream of the base station 1. Therefore, a target CSI-IM resource corresponding to this measurement manner is the CSI-IM 0 (or CSI-IM 2).

(2) When measuring the CSI for the base station 2, the terminal device may perform channel measurement on an NZP CSI-RS resource included in the NZP CSI-RS resource configuration 2, and interference information includes two parts: inter-stream interference from the base station 1 to the base station 2 and interference from a base station other than the base station 1 and the base station 2 to the base station 2. The first-type interference may be measured on an NZP CSI-RS resource (NZP CSI-RS 1) included in the NZP CSI-RS resource configuration 1, and the base station 1 and the base station 2 need to be excluded for the second-type interference. Therefore, measurement needs to be performed on a same CSI-IM resource (a first-type CSI-IM resource), to be specific, the CSI-IM 2 (or CSI-IM 0). Through such measurement, the terminal device may obtain a CQI 2 of a data stream of the base station 2. Therefore, a target CSI-IM resource corresponding to this measurement manner is the CSI-IM 2.

From a perspective of the base station 1 and the base station 2, the base station 1 performs rate matching on the CSI-IM 0 and CSI-IM 1 included in the CSI-IM resource configuration 1, and the base station 2 performs rate matching on the CSI-IM 2 and CSI-IM 3 included in the CSI-IM resource configuration 2. Because both the base station 1 and the base station 2 perform rate matching on the CSI-IM 0 and the CSI-IM 2, the terminal device may obtain interference from another non-serving base station on the CSI-IM resource. In addition, the terminal device separately measures inter-stream interference on a corresponding NZP CSI-RS resource, so that the terminal device can obtain accurate SINR information of each data stream.

It should be understood that, in this case, complete interference information is obtained through joint measurement on an NZP CSI-RS resource and a target CSI-IM resource. Interference from another non-serving base station is measured on the target CSI-IM resource, and inter-stream interference between serving base stations may be measured on an NZP CSI-RS resource corresponding to each base station.

Therefore, the terminal device may predict an interference hypothesis for future data based on a quantity of pieces of DCI, to dynamically select the target CSI-IM resource (the CSI-IM 0 or the CSI-IM 2) from the associated CSI-IM resource configuration, so that corresponding interference information can be accurately obtained, and an accurate CQI can be calculated. Further, the terminal device may report the CQI 1 to the base station 1 and report the CQI 2 to the base station 2.

According to the channel state information reporting method in this embodiment of this application, one NZP CIS-RS resource is configured to be associated with a plurality of CSI-IM resources according to a "pre-scheduling" mechanism, and different CSI-IM resources in the plurality of CSI-IM resources are used for interference measurement on different interference hypotheses. Therefore, the terminal device may dynamically select a target CSI-IM resource based on a quantity of pieces of DCI, to obtain accurate interference information. In this way, not only dynamic information exchange can be avoided, but also accuracy of a measurement result is improved.

Embodiment 2

The terminal device may determine a transmission mechanism set based on a quantity of pieces of received DCI, select a target transmission mechanism from the transmission mechanism set, and determine a target NZP CSI-RS resource and a target CSI-IM resource for the target transmission mechanism to calculate a CQI.

1. The terminal device receives only the DCI 1 sent by the base station 1.

Specifically, if the terminal device receives only the DCI 1 sent by the base station 1, a field (for example, a CSI request field) in the DCI 1 indicates the above CSI configuration, and the field further indicates, from two NZP CSI-RS resource configurations associated with the CSI, an ID of an NPZ CSI-RS configuration and an ID of a CSI-IM configuration that are used for reporting the CSI, for example, a CSI-RS resource configuration 1 and a CSI-IM resource configuration 1. In this case, the transmission mechanism set includes only single-base station transmission. The terminal device determines that the target transmission mechanism is single-base station transmission. In this case, as in Embodiment 1, the target CSI-IM resource is CSI-IM 1 in the CSI-IM configuration 1. Optionally, the terminal device does not need to know a base station from which the DCI 1 comes, and only needs to perform CSI measurement based on the CSI configuration triggered by the DCI 1 and the associated CSI-RS configuration and CSI-IM configuration.

2. The terminal device receives only the DCI 2 sent by the base station 2.

Specifically, if the terminal device receives only the DCI 2 sent by the base station 2, a field (for example, a CSI request field) in the DCI 2 indicates the above CSI configuration, and the field further indicates, from two NZP CSI-RS resource configurations associated with the CSI, an ID of an NPZ CSI-RS resource configuration and an ID of a CSI-IM resource configuration that are used for reporting the CSI, for example, a CSI-RS resource configuration 2 and a CSI-IM resource configuration 2. In this case, the transmission mechanism set includes only single-base station transmission. The terminal device determines that the target transmission mechanism is single-base station transmission. In this case, as in Embodiment 1, the target CSI-IM resource is CSI-IM 3 in the CSI-IM configuration 2. Optionally, the terminal device does not need to know a base station from which the DCI 2 comes, and only needs to perform CSI measurement based on the CSI configuration triggered by the DCI 2 and the associated CSI-RS configuration and CSI-IM configuration.

3. The terminal device receives the DCI 1 of the base station 1 and the DCI 2 of the base station 2.

Specifically, if the terminal device receives the DCI 1 of the base station 1 and the DCI 2 of the base station 2, the terminal device may determine that the above transmission mechanism set includes single-base station transmission of the base station 1, single-base station transmission of the base station 2, and NCJT. The terminal device may measure CSI for one or more transmission mechanisms, and a specific measurement manner is the same as that in Embodiment 1. Details are not described herein again. When CSI is measured for a transmission mechanism, the terminal device may select a corresponding NZP CSI-RS resource and a target CSI-IM resource for measurement to obtain the corresponding CSI. The terminal device determines a target transmission mechanism, and reports CSI in the target transmission mechanism. Optionally, the terminal device may alternatively report one piece of indication information to indicate the target transmission mechanism. It should be understood that the terminal device may determine the target transmission mechanism in a plurality of manners. This is not limited in this embodiment. For example, the terminal device may calculate a sum rate based on a CQI and select a transmission mechanism with a maximum sum rate to recommend.

In this case, the target CSI-IM resource changes based on the target transmission mechanism recommended by the terminal device. In other words, in this case, the target CSI-IM resource may be a first-type CSI-IM resource or a second-type CSI-IM resource.

According to the channel state information reporting method in this embodiment of this application, one NZP CIS-RS resource is configured to be associated with a plurality of CSI-IM resources according to a "pre-scheduling" mechanism, and different CSI-IM resources in the plurality of CSI-IM resources are used for interference measurement on different interference hypotheses. Therefore, the terminal device may determine, based on a quantity of pieces of DCI, transmission mechanisms that can be used, and select a target transmission mechanism from the transmission mechanisms and recommend the target transmission mechanism to the base station, to obtain accurate interference information. In this way, not only dynamic information exchange can be avoided, but also accuracy of a measurement result is improved, thereby obtaining better transmission performance.

The following uses an example in which the base station 1 and the base station 2 may separately send RRC signaling to the terminal device, and separately configure related information of respective CSI reports.

Figure 5:
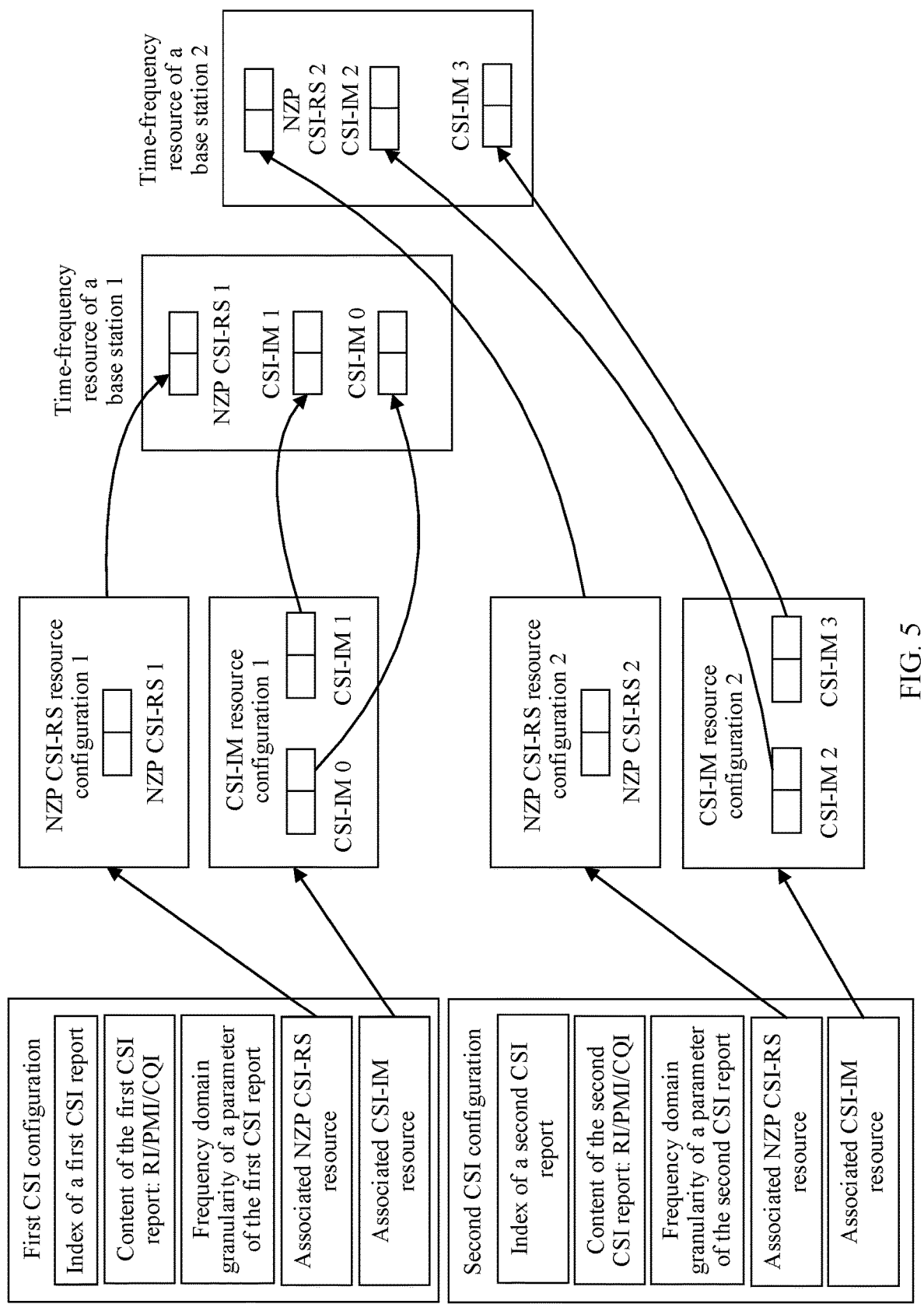
FIG. 5 is a schematic diagram of an association relationship between another channel state information configuration and a resource according to an embodiment of this application.

The terminal device may receive first RRC signaling from the base station 1, and the first RRC signaling is used to configure a first CSI configuration for multi-TRP transmission. The first CSI configuration includes the following:

1. An index of a first CSI report is included.
2. Content of the first CSI report, for example, one or more of an RI, a PMI, and a CQI, is included.
3. A frequency domain granularity of the first CSI report, for example, a broadband report or a sub-band report, is included.
4. Indication information of $n_1$ NZP CSI-RS resource configurations used to measure a channel during CQI calculation is included. Indication information of each NZP CSI-RS resource configuration may be used to determine one NZP CSI-RS resource configuration. One NZP CSI-RS resource configuration indicates $K_1$ associated NZP CSI-RS resources. For example, $K_1=1$, and $n_1=1$. As shown in FIG. 5, an NZP CSI-RS resource configuration associated with the first CSI configuration may be referred to as a CSI-RS resource configuration 1, and $K_1$ NZP CSI-RS resources associated with the CSI-RS resource configuration 1 are the NZP CSI-RS 1.
5. Indication information of the first CSI-IM resource group used to measure interference during CQI calculation is included. Specifically, the indication information may indicate indication information of $m_1$ CSI-IM resource configurations. Indication information of each CSI-IM resource configuration may be used to determine one CSI-IM resource configuration, and the CSI-IM resource configuration may indicate the following information: configuration parameters of $L_1$ CSI-IM resources, where $L_1>2$. Each of the $m_1$ CSI-IM resource configurations is associated with one of the $n_1$ NZP CSI-RS resource configurations. Optionally, $m_1=n_1$.
6. Indication information for indicating that the first CSI configuration is associated with the second CSI configuration is included. For example, the indication information indicates an index of the second CSI configuration.

The terminal device may receive second RRC signaling from the base station 2, and the second RRC signaling is used to configure a second CSI configuration for multi-TRP transmission. The second CSI configuration includes the following:

1. An index of a second CSI report is included.
2. Content of the second CSI report, for example, one or more of an RI, a PMI, and a CQI, is included.
3. A frequency domain granularity of the second CSI report, for example, a broadband report or a sub-band report, is included.
4. Indication information of $n_2$ NZP CSI-RS resource configurations used to measure a channel during CQI calculation is included. Indication information of each NZP CSI-RS resource configuration may be used to determine one NZP CSI-RS resource configuration. One NZP CSI-RS resource configuration indicates $K_2$ associated NZP CSI-RS resources. For example, $K_2=1$, and $n_2=1$. As shown in FIG. 5, an NZP CSI-RS resource configuration associated with the second CSI configuration may be referred to as a CSI-RS resource configuration 2, and $K_2$ NZP CSI-RS resources associated with the CSI-RS resource configuration 2 are the NZP CSI-RS 2.
5. Indication information of the second CSI-IM resource group used to measure interference during CQI calculation is included. Specifically, the indication information may indicate indication information of $m_2$ CSI-IM resource configurations. Indication information of each CSI-IM resource configuration may be used to determine one CSI-IM resource configuration, and the CSI-IM resource configuration may indicate the following information: configuration parameters of $L_2$ CSI-IM resources, where $L_2>2$. Each of the $m_2$ CSI-IM resource configurations is associated with one of the $n_2$ NZP CSI-RS resource configurations. Optionally, $m_2=n_2$.
6. Indication information for indicating that the second CSI configuration is associated with the first CSI configuration is included. For example, the indication information indicates an index of the first CSI configuration.

In a possible implementation, when $n_1=n_2=1$ and $K_1=K_2=1$, $m_1=m_2=1$, and $L_1=L_2=2$. In $L_1=2$ CSI-IM resources included in the CSI-IM resource configuration 1 associated with the first CSI configuration, one CSI-IM resource is used to measure all interference information in single-station transmission, namely, a second-type CSI-IM resource, and the other CSI-IM resource is used to measure interference information from transmission of a non-serving base station other than the two base stations in joint transmission of the two base stations, namely, a first-type CSI-IM resource. Likewise, in $L_2=2$ CSI-IM resources included in the CSI-IM resource configuration 2 associated with the second CSI configuration, one CSI-IM resource is the above second-type CSI-IM resource, and the other CSI-IM resource is the above first-type CSI-IM resource. As shown in FIG. 5, the $L_1=2$ CSI-IM resources included in the CSI-IM resource configuration 1 are CSI-IM 0 and CSI-IM 1, and the $L_2=2$ CSI-IM resources included in the CSI-IM resource configuration 2 are CSI-IM 2 and CSI-IM 3. The CSI-IM 0 and the CSI-IM 2 occupy a same time-frequency resource, and are the above "same CSI-IM resources", namely, the above first-type CSI-IM resource, and the CSI-IM 1 and the CSI-IM 3 occupy different time-frequency resources, namely, the above second-type CSI-IM resource.

Optionally, the base station 1 and the base station 2 may configure the CSI-IM 0 and the CSI-IM 2 as one CSI-IM resource, where the CSI-IM resource has one CSI-IM ID, or may configure the CSI-IM 0 and the CSI-IM 2 as two CSI-IM resources, where the two CSI-IM resources separately have different CSI-IM IDs and/or other parameters, but occupy a same time-frequency resource. This is not limited in this embodiment of this application.

The terminal device receives the DCI sent by the base station 1 and/or the base station 2 at a moment t. It should be understood that the DCI 1 sent by the base station 1 indicates the above first CSI configuration, and the DCI 2 sent by the base station 2 indicates the above second CSI configuration. According to the above "pre-scheduling" mechanism, if a base station sends DCI at the moment t, it indicates that the base station prepares to schedule data at a moment t+k. If the base station does not prepare to schedule data, DCI indicating the above CSI configuration is not sent to the terminal device at the moment t.

After receiving the DCI sent by the base station 1 and/or the base station 2, the terminal device may directly determine a transmission scheme based on a quantity of pieces of DCI, to be specific, single-station transmission (transmission with the base station 1 or transmission with the base station 2) or NCJT (joint transmission with the base station 1 and the base station 2), or may recommend a transmission scheme to the base station based on measured CSI. If only one base station determines to schedule data, the terminal device determines that a possible transmission mechanism is only single-station transmission, and the terminal device may measure CSI only for the transmission mechanism. If the two base stations expect to schedule data, the terminal device may determine that a transmission mechanism includes: transmission with the base station 1, transmission with the base station 2, and NCJT. The terminal device may measure CSI of the two base stations, and determine whether serving by one base station or serving by two base stations is better, that is, determine whether single-station transmission or NCJT is better.

It should be understood that the terminal device determines a target CSI-IM resource based on a quantity of pieces of received DCI, to calculate a CQI. If the terminal device receives a plurality of pieces of DCI, there is an association relationship between a plurality of CSI configurations indicated by the plurality of pieces of DCI. This embodiment of this application may include the following three cases:

1. The terminal device receives only the DCI 1 sent by the base station 1.

Specifically, the terminal device receives only the DCI 1 sent by the base station 1, and a field (for example, a CSI request field) in the DCI 1 indicates the above first CSI configuration, indicating that the base station 1 triggers the terminal device to report the above CSI. The field further indicates, from an NZP CSI-RS resource configuration associated with the CSI, an ID of an NZP CSI-RS resource configuration and an ID of a CSI-IM resource configuration that are used for reporting the CSI, for example, a CSI-RS resource configuration 1 and a CSI-IM resource configuration 1. The terminal device may perform CSI measurement and reporting by using the method corresponding to the scenario in Embodiment 1 or Embodiment 2. Details are not described herein again.

2. The terminal device receives only the DCI 2 sent by the base station 2.

Specifically, the terminal device receives only the DCI 2 sent by the base station 2, and a field (for example, a CSI request field) in the DCI 2 indicates the above second CSI configuration, indicating that the base station 2 triggers the terminal device to report the above CSI. The field further indicates, from an NZP CSI-RS resource configuration associated with the CSI, an ID of an NPZ CSI-RS resource configuration and an ID of a CSI-IM resource configuration that are used for reporting the CSI, for example, a CSI-RS resource configuration 2 and a CSI-IM resource configuration 2. The terminal device may perform CSI measurement and reporting by using the method corresponding to the scenario in Embodiment 1 or Embodiment 2. Details are not described herein again.

3. The terminal device receives the DCI 1 of the base station 1 and the DCI 2 of the base station 2.

Specifically, the terminal device receives the DCI 1 of the base station 1 and the DCI 2 of the base station 2, and the DCI 1 and the DCI 2 respectively indicate the above first CSI configuration and the above second CSI configuration. In addition, the DCI 1 further indicates an NZP CSI-RS resource configuration 1 and a CSI-IM resource configuration 1, and the DCI 2 further indicates an NZP CSIRS resource configuration 2 and a CSI-IM resource configuration 2.

Because the first CSI configuration is associated with the second CSI configuration, the terminal device determines, by receiving two pieces of DCI, that the base station 1 and the base station 2 simultaneously schedule data for the terminal device at a moment t+k, but schedule different data streams. Therefore, the terminal device needs to separately measure CSI for different data streams. In this case, the terminal device may perform CSI measurement and reporting by using the method corresponding to the scenario in Embodiment 1 or Embodiment 2. Details are not described herein again.

It should be understood that "DCI received by the terminal device" mentioned in this embodiment of this application is only DCI used to indicate multi-TRP transmission. In actual application, the terminal device may further receive DCI that has another purpose. This is not limited in this embodiment of this application.

According to the channel state information reporting method in this embodiment of this application, one NZP CIS-RS resource is configured to be associated with a plurality of CSI-IM resources according to a "pre-scheduling" mechanism, and different CSI-IM resources in the plurality of CSI-IM resources are used for interference measurement on different interference hypotheses. Therefore, the terminal device may dynamically select a target CSI-IM resource based on a quantity of pieces of DCI, to obtain accurate interference information. In this way, not only dynamic information exchange can be avoided, but also accuracy of a measurement result is improved. It should be understood that, sequence numbers of the foregoing processes do not mean execution sequences. The execution sequences of the processes should be determined based on functions and internal logic of the processes, and should not be construed as any limitation on the implementation processes of the embodiments of this application.

The channel state information reporting method in the embodiments of this application is described in detail above with reference to FIG. 1 to FIG. 5. A channel state information reporting apparatus in the embodiments of this application is described in detail below with reference to FIG. 6 to FIG. 9.

Figure 6:
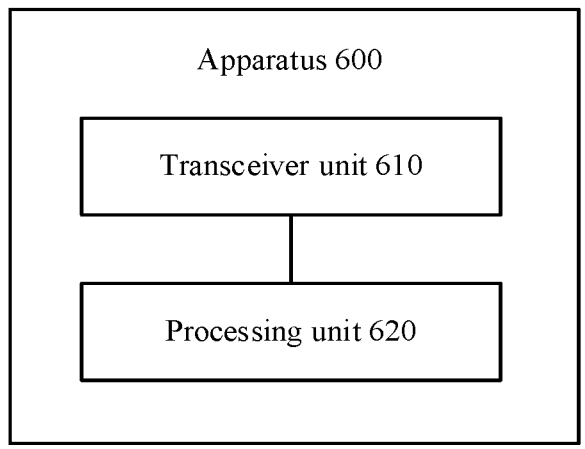
FIG. 6 is a schematic block diagram of a channel state information reporting apparatus according to an embodiment of this application.

FIG. 6 shows a channel state information reporting apparatus 600 according to an embodiment of this application. The apparatus 600 may be the terminal device in the foregoing embodiment, or may be a chip in the terminal device. The apparatus 600 includes:

a transceiver unit 610, configured to receive M pieces of downlink control information, where first downlink control information in the M pieces of downlink control information indicates a first channel state information configuration, the first channel state information configuration is associated with a first channel state information interference measurement CSI-IM resource group, and the first CSI-IM resource group includes $N_1$ CSI-IM resources, where M and $N_1$ are positive integers, and $N_1$ is greater than 1; and a processing unit 620, configured to: measure a target CSI-IM resource, and report channel state information by using the transceiver unit, where the target CSI-IM resource is determined by the terminal device from the $N_1$ CSI-IM resources based on M, and a quantity of target CSI-IM resources is less than $N_1$.

According to the channel state information reporting apparatus in this embodiment of this application, the terminal device determines, based on a quantity of pieces of received downlink control information, a transmission mechanism used for data transmission in the future, selects a target CSI-IM resource from at least two CSI-IM resources to perform interference measurement, and reports channel state information, to avoid dynamic information exchange and improve accuracy of a CSI measurement result, thereby improving system performance.

In one embodiment, when M≥2, second downlink control information in the M pieces of downlink control information indicates a second channel state information configuration, the second channel state information configuration is associated with a second CSI-IM resource group, the second CSI-IM resource group includes $N_2$ CSI-IM resources, and there is an association relationship between the first channel state information configuration and the second channel state information configuration, where $N_2$ is a positive integer.

In one embodiment, the first channel state information configuration is the same as the second channel state information configuration; or the first channel state information configuration and the second channel state information configuration are used for a same transmission mechanism set, and the transmission mechanism set includes a multi-station joint transmission mechanism and a single-station transmission mechanism; or the first channel state information configuration carries first indication information, or the first downlink control information carries the first indication information, and the first indication information is used to indicate that the first channel state information configuration is associated with the second channel state information configuration.

In one embodiment, the $N_1$ CSI-IM resources include a first-type CSI-IM resource and a second-type CSI-IM resource, the first-type CSI-IM resource is used to measure interference information in a multi-station joint transmission mechanism, and the second-type CSI-IM resource is used to measure interference information in a single-station transmission mechanism.

In one embodiment, a $j^{th}$ CSI-IM resource in the $N_1$ CSI-IM resources is predefined as the first-type CSI-IM resource or the second-type CSI-IM resource; or the transceiver unit 610 is further configured to receive third indication information, where the third indication information is used to indicate that the $j^{th}$ CSI-IM resource in the $N_1$ CSI-IM resources is the first-type CSI-IM resource or the second-type CSI-IM resource, where $j \in \{1, \ldots, N_1\}$.

In one embodiment, when M=1, the target CSI-IM resource is the second-type CSI-IM resource.

In one embodiment when M≥2, the target CSI-IM resource is the first-type CSI-IM resource; or when M≥2, the target CSI-IM resource is the first-type CSI-IM resource or the second-type CSI-IM resource.

In one embodiment, the first channel state information configuration is further associated with K channel state information reference signal CSI-RS resources, and at least one of the K CSI-RS resources is associated with $N_1'$ of the $N_1$ CSI-IM resources, where K is a positive integer, and $1 < N_1' \leq N_1$.

In one embodiment, the first CSI-IM resource group occupies X sub-bands, and a target CSI-IM resource on an $x^{th}$ sub-band in the X sub-bands is determined by the terminal device based on a quantity of CSI-IM resource groups that occupy the $x^{th}$ sub-band in CSI-IM resource groups indicated by the M pieces of downlink control information, where X is a positive integer, and $x \in \{1, 2, \ldots, X\}$.

It should be understood that the apparatus 600 herein is embodied in a form of function units. The term "unit" herein may be an application-specific integrated circuit (application specific integrated circuit, ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 600 may be specifically the terminal device in the foregoing embodiment, and the apparatus 600 may be configured to perform the procedures and/or the operations corresponding to the terminal device in the foregoing method embodiment. To avoid repetition, details are not described herein again.

Figure 7:
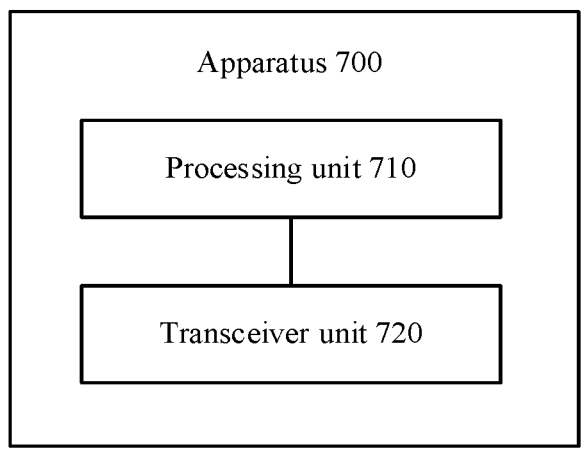
FIG. 7 is a schematic block diagram of another channel state information reporting apparatus according to an embodiment of this application.

FIG. 7 shows another channel state information reporting apparatus 700 according to an embodiment of this application. The apparatus 700 may be the network device in the foregoing embodiment, or may be a chip in the network device. The apparatus 700 includes:

a processing unit 710, configured to determine a first channel state information configuration, where the first channel state information configuration is associated with K channel state information reference signal CSI-RS resources and $N_1$ channel state information interference measurement CSI-IM resources, and at least one of the K CSI-RS resources is associated with $N_1'$ of the $N_1$ CSI-IM resources, where K and $N_1$ are positive integers, and $1 < N_1' \leq N_1$; and a transceiver unit 720, configured to send the first channel state information configuration to a terminal device.

In one embodiment, the first channel state information configuration is further associated with $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

In one embodiment, the first channel state information configuration includes first indication information; or the transceiver unit 720 is further configured to send the first indication information.

The first indication information is used to indicate that the first channel state information configuration is associated with a second channel state information configuration, the second channel state information is associated with $N_2$ CSI-IM resources, the $N_2$ CSI-IM resources include a first-type CSI-IM resource and/or a second-type CSI-IM resource, the first-type CSI-IM resource is used to measure interference information in a multi-station joint transmission mechanism, and the second-type CSI-IM resource is used to measure interference information in a single-station transmission mechanism, where $N_2$ is a positive integer.

In one embodiment, the transceiver unit 720 is further configured to send second indication information, where the second indication information indicates that the first channel state configuration is used for the multi-station joint transmission mechanism or the single-station transmission mechanism.

In one embodiment, the $N_1$ CSI-IM resources include a first-type CSI-IM resource and a second-type CSI-IM resource, the first-type CSI-IM resource is used to measure interference information in a multi-station joint transmission mechanism, and the second-type CSI-IM resource is used to measure interference information in a single-station transmission mechanism.

In one embodiment, a $j^{th}$ CSI-IM resource in the $N_1$ CSI-IM resources is predefined as the first-type CSI-IM resource or the second-type CSI-IM resource; or the transceiver unit 720 is further configured to send third indication information, where the third indication information is used to indicate that the $j^{th}$ CSI-IM resource in the $N_1$ CSI-IM resources is the first-type CSI-IM resource or the second-type CSI-IM resource, where $j \in \{1, \ldots, N_1\}$.

It should be understood that the apparatus 700 herein is embodied in a form of function units. The term "unit" herein may be an application-specific integrated circuit (application specific integrated circuit, ASIC), an electronic circuit, a processor (for example, a shared processor, a dedicated processor, or a group processor) configured to execute one or more software or firmware programs, a memory, a combined logic circuit, and/or another appropriate component that supports the described functions. In an optional example, a person skilled in the art may understand that the apparatus 700 may be specifically the network device in the foregoing embodiment, and the apparatus 700 may be configured to perform the procedures and/or the operations corresponding to the network device in the foregoing method embodiment. To avoid repetition, details are not described herein again.

The apparatus 600 and the apparatus 700 in the foregoing solutions have functions of implementing the corresponding operations performed by the terminal device and the network device in the foregoing methods. The functions may be implemented by hardware, or may be implemented by hardware by executing corresponding software. The hardware or the software includes one or more modules corresponding to the functions. For example, a sending unit may be replaced with a transmitter, a receiving unit may be replaced with a receiver, and another unit such as a determining unit may be replaced with a processor, to respectively perform a receiving/sending operation and a related processing operation in each method embodiment.

In the embodiments of this application, the apparatus in FIG. 6 and the apparatus in FIG. 7 may be alternatively a chip or a chip system, for example, a system on chip (system on chip, SoC). Correspondingly, the receiving unit and the sending unit may be a transceiver circuit of the chip. This is not limited herein.

Figure 8:
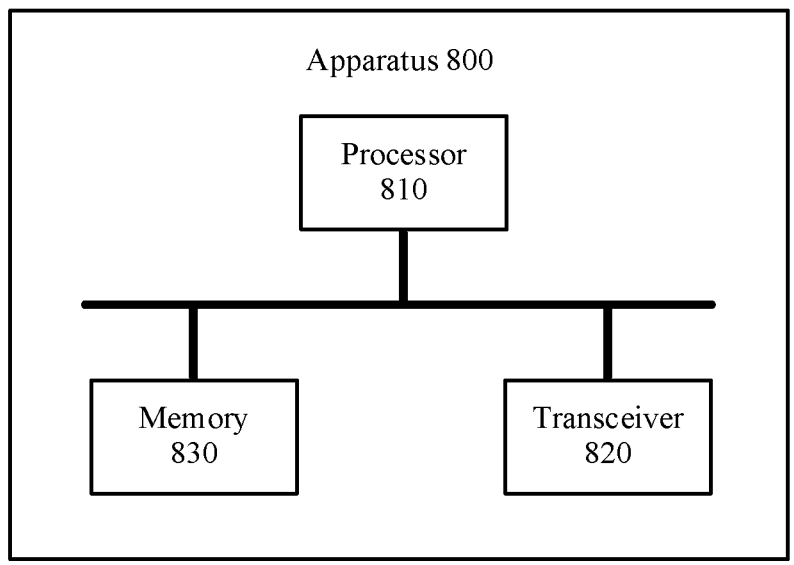
FIG. 8 is a schematic block diagram of another channel state information reporting apparatus according to an embodiment of this application.

FIG. 8 shows another channel state information reporting apparatus 800 according to an embodiment of this application. The apparatus 800 includes a processor 810, a transceiver 820, and a memory 830. The processor 810, the transceiver 820, and the memory 830 communicate with each other by using an internal connection path. The memory 830 is configured to store an instruction. The processor 810 is configured to execute the instruction stored in the memory 830, to control the transceiver 820 to send a signal and/or receive a signal.

The processor 810 is configured to: receive M pieces of downlink control information by using the transceiver 820, where first downlink control information in the M pieces of downlink control information indicates a first channel state information configuration, the first channel state information configuration is associated with a first channel state information interference measurement CSI-IM resource group, and the first CSI-IM resource group includes $N_1$ CSI-IM resources, where M and $N_1$ are positive integers, and $N_1$ is greater than 1; and measure a target CSI-IM resource, and report channel state information by using the transceiver 820, where the target CSI-IM resource is determined by the terminal device from the $N_1$ CSI-IM resources based on M, and a quantity of target CSI-IM resources is less than $N_1$. It should be noted that the apparatus 800 may be specifically the terminal device in the foregoing embodiment, and may be configured to perform the operations and/or the procedures corresponding to the terminal device in the foregoing method embodiment. Optionally, the memory 830 may include a read-only memory and a random access memory, and provide an instruction and data to the processor. A part of the memory may further include a non-volatile random access memory. For example, the memory may further store information about a device type. The processor 810 may be configured to execute the instruction stored in the memory. In addition, when the processor 810 executes the instruction stored in the memory, the processor 810 is configured to perform the operations and/or the procedures corresponding to the terminal device in the foregoing method embodiment.

Figure 9:
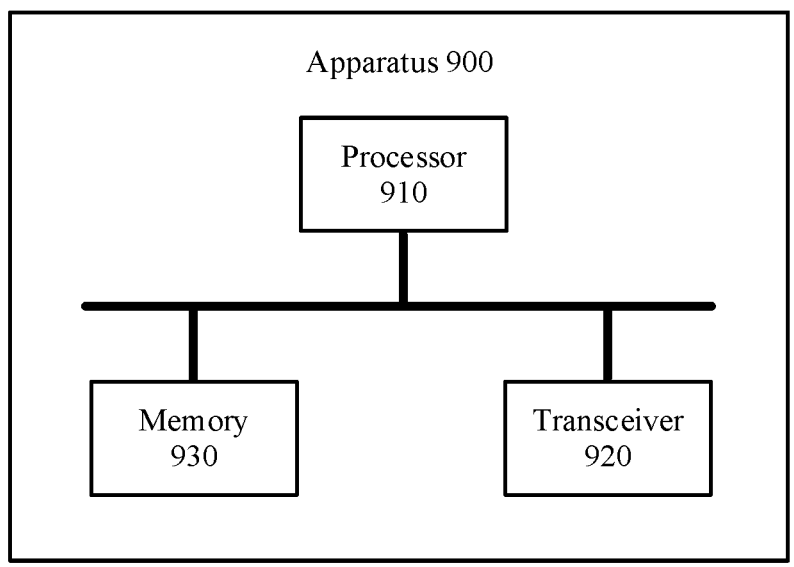
FIG. 9 is a schematic block diagram of another channel state information reporting apparatus according to an embodiment of this application.

FIG. 9 shows another channel state information reporting apparatus 900 according to an embodiment of this application. The apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or receive a signal.

The processor 910 is configured to: determine a first channel state information configuration, where the first channel state information configuration is associated with K channel state information reference signal CSI-RS resources and $N_1$ channel state information interference measurement CSI-IM resources, and at least one of the K CSI-RS resources is associated with $N_1'$ of the $N_1$ CSI-IM resources, where K and $N_1$ are positive integers, and $1 < N_1' \leq N_1$; and send the first channel state information configuration to a terminal device by using the transceiver 920. It should be understood that the apparatus 900 may be specifically the network device in the foregoing embodiment, and may be configured to perform the operations and/or the procedures corresponding to the network device in the foregoing method embodiment. Optionally, the memory 930 may include a read-only memory and a random access memory, and provide an instruction and data to the processor. A part of the memory may further include a non-volatile random access memory. For example, the memory may further store information about a device type. The processor 910 may be configured to execute the instruction stored in the memory. In addition, when the processor 910 executes the instruction stored in the memory, the processor 910 is configured to perform the operations and/or the procedures corresponding to the network device in the foregoing method embodiment. It should be understood that in the embodiments of this application, the processor in the foregoing apparatus may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, operations in the foregoing methods can be completed by an integrated logic circuit of hardware or instructions in a form of software in the processor. The operations of the method disclosed with reference to the embodiments of this application may be directly performed by a hardware processor, or may be performed by using a combination of hardware and a software unit in the processor. The software unit may be located in a mature storage medium in the art, such as a random access memory, a flash memory, a read-only memory, a programmable read-only memory, an electrically erasable programmable memory, a register, or the like. The storage medium is located in the memory, and the processor executes the instruction in the memory, and completes the operations of the foregoing methods in combination with the hardware of the processor. To avoid repetition, details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in the embodiments disclosed in this specification, method operations and units may be implemented by electronic hardware, computer software, or a combination thereof. To clearly describe the interchangeability between the hardware and the software, the foregoing has usually described operations and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, an optical disc, or the like.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information reporting method, comprising:
receiving, by a terminal device, M pieces of downlink control information, wherein first downlink control information in the M pieces of downlink control information indicates a first channel state information configuration associated with a first channel state information interference measurement (CSI-IM) resource group, and wherein the first CSI-IM resource group comprises $N_1$ CSI-IM resources, wherein M and $N_1$ are positive integers, and wherein $N_1$ is greater than 1; and
measuring, by the terminal device, at least one target CSI-IM resource, and reporting channel state information, wherein the at least one target CSI-IM resource is determined by the terminal device from the $N_1$ CSI-IM resources based on a value of M, and wherein a quantity of the at least one target CSI-IM resources is less than $N_1$.

2. The method according to claim 1, wherein when M≥2, second downlink control information in the M pieces of downlink control information indicates a second channel state information configuration associated with a second CSI-IM resource group, wherein the second CSI-IM resource group comprises $N_2$ CSI-IM resources, and wherein there is an association relationship between the first channel state information configuration and the second channel state information configuration, wherein $N_2$ is a positive integer.

3. The method according to claim 2, wherein the first channel state information configuration is the same as the second channel state information configuration; or
wherein the first channel state information configuration and the second channel state information configuration are used for a same transmission mechanism set, and wherein the same transmission mechanism set comprises a multi-station joint transmission mechanism and a single-station transmission mechanism; or
wherein the first channel state information configuration carries first indication information, or the first downlink control information carries the first indication information, and wherein the first indication information is to indicate that the first channel state information configuration is associated with the second channel state information configuration.

4. The method according to claim 1, wherein the $N_1$ CSI-IM resources comprise a first-type CSI-IM resource and a second-type CSI-IM resource, wherein the first-type CSI-IM resource is to measure interference information in a multi-station joint transmission mechanism, and wherein the second-type CSI-IM resource is to measure interference information in a single-station transmission mechanism.

5. The method according to claim 4, wherein a $j^{th}$ CSI-IM resource in the $N_1$ CSI-IM resources is predefined as the first-type CSI-IM resource or the second-type CSI-IM resource; or
the method further comprises:
receiving, by the terminal device, third indication information, wherein the third indication information is to indicate that the $j^{th}$ CSI-IM resource in the $N_1$ CSI-IM resources is the first-type CSI-IM resource or the second-type CSI-IM resource, wherein $j \in \{1, \ldots, N_1\}$.

6. The method according to claim 4, wherein when M=1, the at least one target CSI-IM resource is the second-type CSI-IM resource.

7. The method according to claim 4, wherein when M≥2, the at least one target CSI-IM resource is the first-type CSI-IM resource; or
when M≥2, the at least one target CSI-IM resource is the first-type CSI-IM resource or the second-type CSI-IM resource.

8. A channel state information reporting method, comprising:
determining, by a network device, a first channel state information configuration associated with K channel state information reference signal (CSI-RS) resources and $N_1$ channel state information interference measurement resources, and wherein at least one of the K CSI-RS resources is associated with 1 of the $N_1'$ CSI-IM resources, wherein K and $N_1$ are positive integers, and $1 \leq N_1' \leq N_1$; and
sending, by the network device, the first channel state information configuration to a terminal device.

9. The method according to claim 8, wherein the first channel state information configuration is further associated with $N_2$ CSI-IM resources, wherein the $N_2$ CSI-IM resources comprise a first-type CSI-IM resource and/or a second-type CSI-IM resource, wherein the first-type CSI-IM resource is to measure interference information in a multi-station joint transmission mechanism, and wherein the second-type CSI-IM resource is to measure interference information in a single-station transmission mechanism, wherein $N_2$ is a positive integer.

10. The method according to claim 8, wherein the first channel state information configuration comprises first indication information; or
the method further comprises:
sending, by the network device, the first indication information, wherein
the first indication information is to indicate that the first channel state information configuration is associated with a second channel state information configuration associated with $N_2$ CSI-IM resources, wherein the $N_2$ CSI-IM resources comprise a first-type CSI-IM resource and/or a second-type CSI-IM resource, wherein the first-type CSI-IM resource is to measure interference information in a multi-station joint transmission mechanism, and wherein the second-type CSI-IM resource is to measure interference information in a single-station transmission mechanism, wherein $N_2$ is a positive integer.

11. The method according to claim 8, wherein the method further comprises:
sending, by the network device, second indication information to indicate that the first channel state configuration is used for a multi-station joint transmission mechanism or a single-station transmission mechanism.

12. The method according to claim 8, wherein the $N_1$ CSI-IM resources comprise a first-type CSI-IM resource and a second-type CSI-IM resource, wherein the first-type CSI-IM resource is to measure interference information in a multi-station joint transmission mechanism, and wherein the second-type CSI-IM resource is to measure the interference information in a single-station transmission mechanism.

13. The method according to claim 12, wherein a $j^{th}$ CSI-IM resource in the $N_1$ CSI-IM resources is predefined as the first-type CSI-IM resource or the second-type CSI-IM resource; or
the method further comprises:
sending, by the network device, third indication information to indicate that the $j^{th}$ CR-IM resource in the $N_1$ CSI-IM resources is the first-type CSI-IM resource or the second-type CSI-IM resource, wherein $j \in \{1, \ldots, N_1\}$.

14. A channel state information reporting apparatus, comprising:
a transceiver, configured to receive M pieces of downlink control information, wherein first downlink control information in the M pieces of downlink control information indicates a first channel state information configuration associated with a first channel state information interference measurement (CSI-IM) resource group, and wherein the first CSI-IM resource group comprises N₁ CSI-IM resources, wherein M and $N_1$ are positive integers, and $N_1$ is greater than 1; and a processor, configured to: measure at least one target CSI-IM resource, and report channel state information by using the transceiver, wherein the at least one target CSI-IM resource is determined by a terminal device from the $N_1$ CSI-IM resources based on a value of M, and a quantity of the at least one target CSI-IM resources is less than $N_1$.

15. The apparatus according to claim 14, wherein when M≥2, second downlink control information in the M pieces of downlink control information indicates a second channel state information configuration associated with a second CSI-IM resource group, wherein the second CSI-IM resource group comprises $N_2$ CSI-IM resources, and wherein there is an association relationship between the first channel state information configuration and the second channel state information configuration, wherein $N_2$ is a positive integer.

16. The apparatus according to claim 15, wherein the first channel state information configuration is the same as the second channel state information configuration; or wherein the first channel state information configuration and the second channel state information configuration are used for a same transmission mechanism set, and wherein the same transmission mechanism set comprises a multi-station joint transmission mechanism and a single-station transmission mechanism; or wherein the first channel state information configuration carries first indication information, or the first downlink control information carries the first indication information, and wherein the first indication information is to indicate that the first channel state information configuration is associated with the second channel state information configuration.

17. The apparatus according to claim 15, wherein the $N_1$ CSI-IM resources comprise a first-type CSI-IM resource and a second-type CSI-IM resource, wherein the first-type CSI-IM resource is used to measure interference information in a multi-station joint transmission mechanism, and wherein the second-type CSI-IM resource is to measure interference information in a single-station transmission mechanism.

18. The apparatus according to claim 17, wherein a $j^{th}$ CSI-IM resource in the $N_1$ CSI-IM resources is predefined as the first-type CSI-IM resource or the second-type CSI-IM resource; or the transceiver is further configured to:
receive third indication information, wherein the third indication information is to indicate that the $j^{th}$ CSI-IM resource in the $N_1$ CSI-IM resources is the first-type CSI-IM resource or the second-type CSI-IM resource, wherein $j \in \{1, \ldots, N_1\}$.

19. The apparatus according to claim 17, wherein when M=1, the at least one target CSI-IM resource is the second-type CSI-IM resource.

20. The apparatus according to claim 17, wherein when M≥2, the at least one target CSI-IM resource is the first-type CSI-IM resource; or when M≥2, the at least one target CSI-IM resource is the first-type CSI-IM resource or the second-type CSI-IM resource.

* * * * *

UNITED STATES PATENT AND TRADEMARK OFFICE
CERTIFICATE OF CORRECTION

PATENT NO. : 11,888,563 B2
APPLICATION NO. : 17/171627
DATED : January 30, 2024
INVENTOR(S) : Xueru Li et al.

It is certified that error appears in the above-identified patent and that said Letters Patent is hereby corrected as shown below:

In the Claims

In Claim 1, Column 45, Line 4, delete, "CSI-IM resources" and insert --CSI-IM resource--.

In Claim 8, Column 45, Lines 65-66, delete "interference measurement resources" and insert --interference measurement (CSI-IM) resources--.

In Claim 13, Column 46, Line 53, delete "CR-IM resource" and insert --CSI-IM resource--.

Signed and Sealed this
Twentieth Day of August, 2024

Katherine Kelly Vidal
*Director of the United States Patent and Trademark Office*